US012687806B2

(12) United States Patent
Hirano et al.

(10) Patent No.: US 12,687,806 B2
(45) Date of Patent: Jul. 21, 2026

(54) FIXING DEVICE AND IMAGE FORMING APPARATUS INCORPORATING SAME

(71) Applicants: Daisuke Hirano, Kanagawa (JP); Yuusuke Furuichi, Kanagawa (JP); Naohiro Kumagai, Kanagawa (JP)

(72) Inventors: Daisuke Hirano, Kanagawa (JP); Yuusuke Furuichi, Kanagawa (JP); Naohiro Kumagai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/836,609

(22) PCT Filed: Jan. 23, 2023

(86) PCT No.: PCT/IB2023/050532

§ 371 (c)(1),
(2) Date: Aug. 7, 2024

(87) PCT Pub. No.: WO2023/166359

PCT Pub. Date: Sep. 7, 2023

(65) Prior Publication Data

US 2025/0130520 A1 Apr. 24, 2025

(30) Foreign Application Priority Data

Mar. 1, 2022 (JP) ................................ 2022-030766

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
CPC .......... G03G 15/2017; G03G 15/2053; G03G 2215/2003
See application file for complete search history.

(56) References Cited

U.S. PATENT DOCUMENTS

2005/0163540 A1 7/2005 Umezawa et al.
2011/0091236 A1 4/2011 Oi et al.
(Continued)

FOREIGN PATENT DOCUMENTS

JP 2005-166299 A 6/2005
JP 2011-085866 A 4/2011
(Continued)

OTHER PUBLICATIONS

JP 2014074770 English machine translation, Asano, Apr. 24, 2014 (Year: 2014).*
(Continued)

*Primary Examiner* — Thomas S Giampaolo, II
(74) *Attorney, Agent, or Firm* — Harness, Dickey & Pierce, P.L.C.

(57) ABSTRACT

A fixing device includes a rotator, a pressure rotator, a heater, a conductor, and a resistor. The rotator includes a conductive layer. The pressure rotator presses the rotator to form a fixing nip between the rotator and the pressure rotator. The heater is in contact with an inner surface of the rotator to heat the rotator. The conductor is in contact with the conductive layer of the rotator and has a resistance value larger than 100 kΩ. The resistor has one end electrically coupled in series to the conductor and another end grounded via an image forming apparatus.

20 Claims, 17 Drawing Sheets

(56) References Cited

U.S. PATENT DOCUMENTS

| | | | |
|---|---|---|---|
| 2020/0249602 | A1 | 8/2020 | Inoue et al. |
| 2021/0278790 | A1 | 9/2021 | Furuichi et al. |
| 2022/0155712 | A1 | 5/2022 | Imada et al. |
| 2022/0291615 | A1 | 9/2022 | Nanno et al. |
| 2022/0382191 | A1 | 12/2022 | Furuichi et al. |
| 2023/0004108 | A1 | 1/2023 | Furuichi et al. |
| 2023/0185222 | A1 | 6/2023 | Furuichi et al. |
| 2023/0205118 | A1 | 6/2023 | Ishigaya et al. |
| 2023/0229101 | A1 | 7/2023 | Shida et al. |

FOREIGN PATENT DOCUMENTS

| | | | |
|---|---|---|---|
| JP | 2014074770 | A | 4/2014 |
| JP | 2020052345 | A | 4/2020 |
| JP | 2023069406 | A | 5/2023 |

OTHER PUBLICATIONS

International Search Report and Written Opinion issued on Mar. 20, 2023 in PCT/IB2023/050532 filed on Jan. 23, 2023.

Japanese Office Action dated Nov. 7, 2025 for corresponding Japanese Application No. 2022-030766.

* cited by examiner

FIXING DEVICE AND IMAGE FORMING APPARATUS INCORPORATING SAME

CROSS-REFERENCE TO RELATED APPLICATIONS

This application is a national phase under 35 U.S.C. § 371 of PCT International Application No. PCT/IB2023/050532 which has an International filing date of Jan. 23, 2023, which claims priority to Japanese Application No. 2022-030766, filed Mar. 1, 2022, the entire contents of each of which are hereby incorporated by reference.

TECHNICAL FIELD

Embodiments of the present disclosure generally relate to a fixing device and an image forming apparatus incorporating the fixing device.

BACKGROUND ART

One type of image forming apparatus includes a fixing device. One type of fixing device includes a fixing belt as a fixing rotator and a heater in contact with the inner circumferential surface of the fixing belt. The heater includes a resistive heat generator. A current flowing through the heater causes the resistive heat generator to generate heat. The heat heats the fixing belt. The heater includes an insulation layer to insulate a conductive layer of the heater from the fixing belt.

A lightning strike causes a common mode surge in a commercial power supply. A surge current is an excessive current. The excessive current flows through the insulation layer. The insulation layer may be damaged.

To avoid the damage of the insulation layer described above, for example, Japanese Unexamined Patent Application Publication No. 2014-074770 discloses a static charge eliminator made of metal hair. The static charge eliminator is brought into contact with the surface of a fixing film and grounded via a resistor having a resistance of about several MΩ.

CITATION LIST

Patent Literature

[PTL 1]
Japanese Unexamined Patent Application Publication No. 2014-074770

SUMMARY OF INVENTION

Technical Problem

If the resistor is damaged, or if discharge occurs between terminals, the static charge eliminator disclosed in the above published document may not have sufficient performance. A more reliable configuration is desired to avoid the damage of the insulation layer in the heater caused by the surge current described above. An object of the present disclosure is providing a fixing device including a highly reliable configuration that can avoid damage of an insulation layer in a heater caused by an excessive current such as a surge current.

Solution to Problem

According to embodiments of the present disclosure, a fixing device includes a rotator, a pressure rotator, a heater, a conductor, and a resistor. The rotator includes a conductive layer. The pressure rotator presses the rotator to form a fixing nip between the rotator and the pressure rotator. The heater is in contact with an inner surface of the rotator to heat the rotator. The conductor is in contact with the conductive layer of the rotator and has a resistance value larger than 100 kΩ. The resistor has one end electrically coupled in series to the conductor and another end grounded via an image forming apparatus.

Advantageous Effects of Invention

The present disclosure provides a fixing device including a highly reliable configuration that can avoid damage of an insulation layer in a heater caused by an excessive current such as a surge current.

BRIEF DESCRIPTION OF DRAWINGS

A more complete appreciation of the embodiments and many of the attendant advantages and features thereof can be readily obtained and understood from the following detailed description with reference to the accompanying drawings

Figure 1:
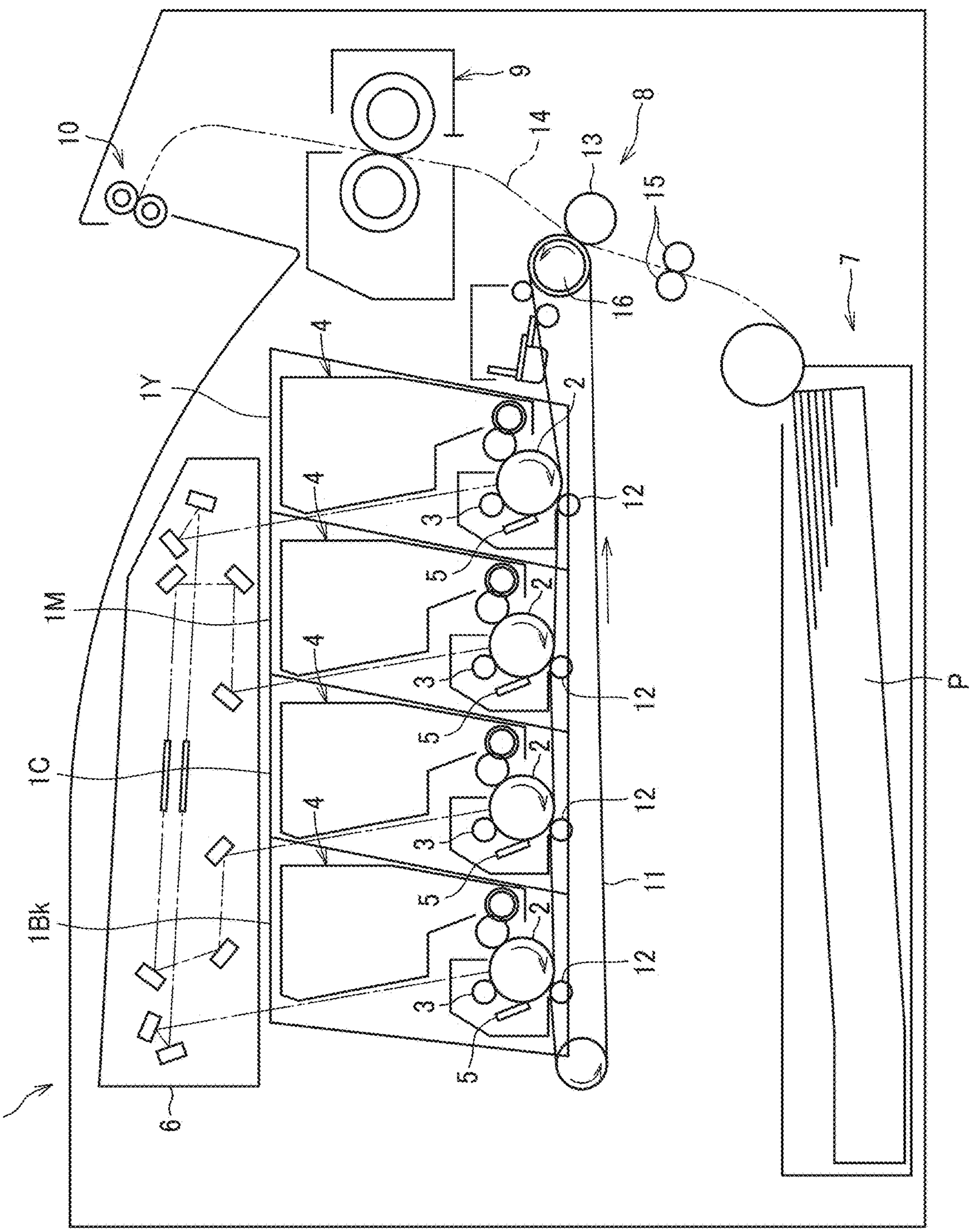
FIG. 1 is a schematic sectional view of an image forming apparatus according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise. In the drawings illustrating the following embodiments, the same reference numbers are allocated to elements having the same function or shape and redundant descriptions thereof are omitted below.

FIG. 1 is a schematic sectional view of an image forming apparatus 100 according to an embodiment of the present disclosure.

The image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form a toner image. The cleaning device 5 cleans the surface of the photoconductor 2.

The image forming apparatus 100 includes an exposure device 6, a sheet feeder 7, a transfer device 8, a fixing device 9 as a heating device, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk, photoconductors 2, the charging devices 3, the exposure device 6, the transfer device 8, and the like configure an image forming device that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched by a plurality of rollers. Each of the four primary transfer rollers 12 transfers the toner image from each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip between the intermediate transfer belt 11 and each of the photoconductors 2. The secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is disposed between the sheet feeder 7 and the secondary transfer nip defined by the secondary transfer roller 13 in the sheet conveyance path 14.

Referring to FIG. 1, a description is provided of printing processes performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from a terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip defined by each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip so that the sheet P meets the full color toner image formed on the intermediate transfer belt 11 at the secondary transfer nip. Thus, the full color toner image is transferred onto and borne on the sheet P. After the toner image is transferred from each of the photoconductors 2 onto the intermediate transfer belt 11, each of cleaning devices 5 removes residual toner on each of the photoconductors 2.

After the full color toner image is transferred onto the sheet P, the sheet P is conveyed to the fixing device 9 to fix the full color toner image onto the sheet P. Thereafter, the sheet ejection device 10 ejects the sheet P onto the outside of the image forming apparatus 100, thus finishing a series of printing processes.

Next, a configuration of the fixing device 9 is described.

Figure 2:
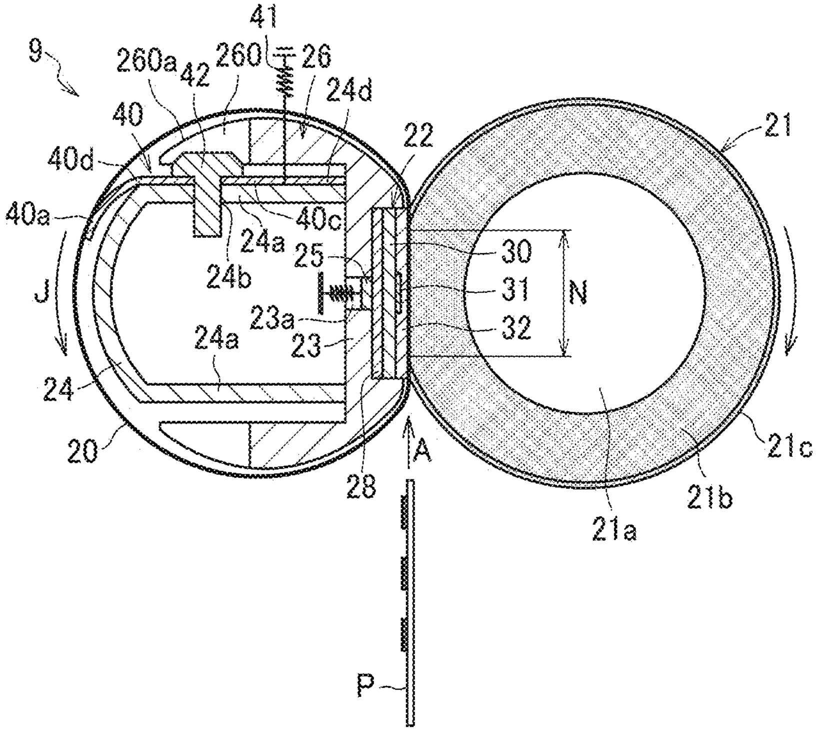
FIG. 2 is a schematic sectional side view of a fixing device incorporated in the image forming apparatus of FIG. 1.

As illustrated in FIG. 2, the fixing device 9 according to the present embodiment includes a fixing belt 20, a pressure roller 21 as an opposed rotator or a pressure rotator, a heater 22 as a heating member, a heater holder 23 as a holder, a stay 24, a thermistor 25 as a temperature detector, a first high thermal conduction member 28, and a conductor 40. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 detects the temperature of the first high thermal conduction member 28.

The fixing belt 20, the pressure roller 21, the heater 22, the heater holder 23, the stay 24, and the first high thermal conduction member 28 extend in a direction perpendicular to the sheet surface of FIG. 2. Hereinafter, the direction is simply referred to as a longitudinal direction. The longitudinal direction is indicated by a double-headed arrow X in FIG. 3. Hereinafter, this direction is simply referred to as the longitudinal direction. Note that the longitudinal direction is also a width direction of the sheet P conveyed, a belt width direction of the fixing belt 20, and an axial direction of the pressure roller 21. A direction indicated by an arrow A in FIG. 2 is a sheet conveyance direction. Hereinafter, an upstream side in the sheet conveyance direction that is a lower side in FIG. 2 is simply referred to as the upstream side, and a downstream side in the sheet conveyance direction that is an upper side in FIG. 2 is simply referred to as the downstream side. A fixing rotator disposed in the fixing device is an aspect of a rotator disposed in the fixing device of the present disclosure. The fixing device 9 in the present embodiment includes the fixing belt 20 as an example of the fixing rotator. The stay 24 is an example of a first facing member disposed in the fixing device of the present disclosure and is also a support that supports the holder.

The fixing belt 20 includes a base layer configured by, for example, a tubular base made of polyimide (PI), and the tubular base has an outer diameter of 25 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) and polytetrafluoroethylene (PTFE) and has a thickness in a range of from 5 μm to 50 μm to enhance durability of the fixing belt 20 and facilitate separation of the sheet P and a foreign substance from the fixing belt 20. An elastic layer made of rubber having a thickness of from 50 to 500 μm is interposed between the base and the release layer. The base of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with polyimide or polytetrafluoroethylene (PTFE) as a slide layer.

The pressure roller 21 having, for example, an outer diameter of 25 mm, includes a solid iron core 21*a*, an elastic layer 21*b* formed on the surface of the core 21*a*, and a release layer 21*c* formed on the outside of the elastic layer 21*b*. The elastic layer 21*b* is made of silicone rubber and has a thickness of 3.5 mm, for example. Preferably, the release layer 21*c* is formed by a fluororesin layer having, for example, a thickness of approximately 40 μm on the surface of the elastic layer 21*b* to improve releasability.

The pressure roller 21 is biased toward the fixing belt 20 by a biasing member and pressed against the heater 22 via the fixing belt 20. Thus, the fixing nip N is formed between the fixing belt 20 and the pressure roller 21. A driver drives and rotates the pressure roller 21 in a direction indicated by the arrow in FIG. 2, and the rotation of the pressure roller 21 rotates the fixing belt 20 in a direction indicated by an arrow J in FIG. 2.

The heater 22 is disposed to contact the inner circumferential surface of the fixing belt 20. The heater 22 in the present embodiment contacts the pressure roller 21 via the fixing belt 20 and serves as a nip formation pad to form the fixing nip N between the pressure roller 21 and the fixing belt 20. The fixing belt 20 is a heated member heated by the heater 22.

The heater 22 is a planar heater extending in the longitudinal direction thereof parallel to the width direction of the fixing belt 20. The heater 22 includes a planar base 30, resistive heat generators 31 disposed on the base 30, and an insulation layer 32 covering the resistive heat generators 31. A power supply 200 (see FIG. 4) applies an alternating current (AC) voltage to the heater 22, and the resistive heat generators 31 mainly generate heat to heat the fixing belt 20.

The insulation layer 32 of the heater 22 contacts the inner circumferential surface of the fixing belt 20, and the heat generated from the resistive heat generators 31 is transmitted to the fixing belt 20 through the insulation layer 32. Although the resistive heat generators 31 and the insulation layer 32 are disposed on the side of the base 30 facing the fixing belt 20 (that is, the fixing nip N) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with the material having the high thermal conductivity enables to sufficiently heat the fixing belt 20 even if the resistive heat generators 31 are disposed on the side of the base 30 opposite to the side facing the fixing belt 20.

The heater holder 23 and the stay 24 are disposed inside a loop of the fixing belt 20. The stay 24 is configured by a channeled metallic member, and both side plates of the fixing device 9 support both end portions of the stay 24 in the longitudinal direction of the stay 24. Since the stay 24 supports the heater holder 23 and the heater 22, the heater 22 reliably receives a pressing force of the pressure roller 21 pressed against the fixing belt 20. Thus, the fixing nip N is stably formed between the fixing belt 20 and the pressure roller 21. In the present embodiment, the thermal conductivity of the heater holder 23 is set to be smaller than the thermal conductivity of the base 30.

The stay 24 has a substantially U-shape having right-angle portions 24*a* that are an upstream side wall and a downstream side wall in the sheet conveyance direction. Each end of the right-angle portions 24*a* is in contact with the heater holder 23 to support the heater holder 23. The right-angle portion 24*a* extends in a lateral direction in FIG. 2 that is a pressing direction of the pressure roller 21. The stay 24 is grounded via a resistor 41.

In other words, the stay 24 according to the present embodiment has portions extending in the pressing direction of the pressure roller 21 that is the lateral direction in FIG. 2, the portions each having a thickness. The portions are disposed in the left part in FIG. 2 so as to face the pressure roller 21. Bringing the portions into contact with the heater holder 23 supports the heater holder 23. Such a configuration reduces a bend of the heater holder 23 caused by the pressing force from the pressure roller 21, in particular, the bend in the longitudinal direction of the heater holder 23 in the present embodiment. However, the above-described contact between the stay 24 and the heater holder 23 includes not only the case where the stay 24 is in direct contact with the heater holder 23 but also the case where the stay 24 contacts the heater holder 23 via another member. The term "contact via another member" means a state in which another member is interposed between the stay 24 and the heater holder 23 in the lateral direction in FIG. 2, and at a position corresponding to at least a part of the member, the stay 24 contacts the member, and the member contacts the heater holder 23. The term "extending in the pressing direction" is not limited to a case where the portion of the stay 24 extends in the same direction as the pressing direction of the pressure roller 21 but includes the case where the portion of the stay 24 extends in a direction with a certain angle from the pressing direction of the pressure roller 21. Even in such cases, the stay 24 can reduce bending of the heater holder 23 under pressure from the pressure roller 21.

Since the heater holder 23 is subject to temperature increase by heat from the heater 22, the heater holder 23 is preferably made of a heat resistant material. The heater holder 23 made of heat-resistant resin having low thermal conduction, such as a liquid crystal polymer (LCP) or PEEK, reduces heat transfer from the heater 22 to the heater holder 23. Thus, the heater 22 can effectively heat the fixing belt 20.

Figure 17:
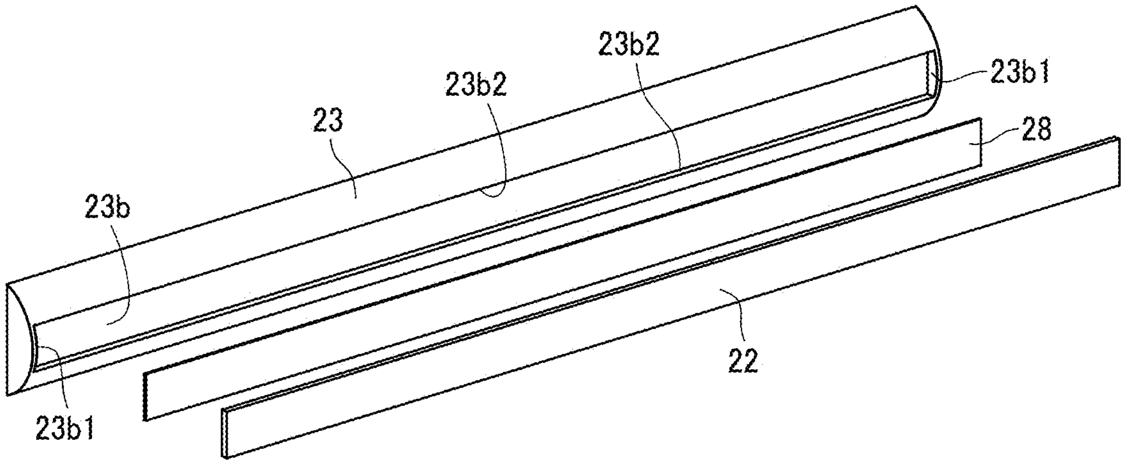
FIG. 17 is a perspective view of the heater, a first high thermal conduction member, and a heater holder.

As illustrated in FIG. 17, the heater holder 23 has a recessed portion 23*b* to hold the heater 22 and the first high thermal conduction member 28.

As illustrated in FIG. 2, the heater holder 23 includes guide portions 26 to guide the fixing belt 20. The heater holder 23 and the guide portions 26 may be formed as one part. The guide portions 26 include upstream portions upstream from the heater holder 23 and downstream portions downstream from the heater holder 23 in the sheet conveyance direction.

The guide portions 26 include a plurality of guide ribs 260 as guides. Each guide rib 260 has a substantial fan shape. The guide rib 260 has a guide surface 260*a* that is an arc-shaped or convex curved surface extending in a belt circumferential direction along the inner circumferential surface of the fixing belt 20.

The heater holder 23 has openings 23*a* extending through the heater holder 23 in the thickness direction thereof. The thermistor 25 and a thermostat which is described later are disposed in the openings 23*a*. Springs press the thermistor 25 and the thermostat against the back surface of the first high thermal conduction member 28. However, the first high thermal conduction member 28 and a second high thermal conduction member described later may have openings similar to the openings 23*a* to press the thermistor 25 and the thermostat against the back surface of the base 30.

The first high thermal conduction member 28 is made of a material having a thermal conductivity higher than a thermal conductivity of the base 30. In the present embodiment, the first high thermal conduction member 28 is a plate made of aluminum. Alternatively, the first high thermal conduction member 28 may be made of copper, silver, graphene, or graphite, for example. The first high thermal conduction member 28 that is the plate can improve accuracy of positioning of the heater 22 with respect to the heater holder 23 and the first high thermal conduction member 28.

Next, a method of calculating the thermal conductivity is described. In order to calculate the thermal conductivity, the thermal diffusivity of a target object is firstly measured. Using the thermal diffusivity, the thermal conductivity is calculated.

The thermal diffusivity was measured using a thermal diffusivity/conductivity measuring device (trade name: AI-PHASE MOBILE 1U, manufactured by Ai-Phase co., ltd.).

In order to convert the thermal diffusivity into thermal conductivity, values of density and specific heat capacity are necessary. The density was measured by a dry automatic densitometer (trade name: ACCUPYC 1330 manufactured by Shimadzu Corporation). The specific heat capacity was measured by a differential scanning calorimeter (trade name: DSC-60 manufactured by Shimadzu Corporation), and sapphire was used as a reference material in which the specific heat capacity is known. In the present embodiment, the specific heat capacity was measured five times, and an average value was calculated and used to obtain the thermal conductivity. A temperature condition was 50° C. The thermal conductivity λ is obtained by the following expression (1).

Expression (1)

$$\lambda=\rho\times C\times\alpha. \quad (1)$$

where ρ is the density, C is the specific heat capacity, and α is the thermal diffusivity obtained by the thermal diffusivity measurement described above.

When the fixing device 9 according to the present embodiment starts printing, the pressure roller 21 is driven to rotate, and the fixing belt 20 starts to be rotated. The guide surface 260*a* of the guide rib 260 contacts and guides the inner circumferential surface of the fixing belt 20 to stably and smoothly rotates the fixing belt 20. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed to the fixing nip N between the fixing belt 20 and the pressure roller 21, and the unfixed toner image is heated and pressed to be fixed to the sheet P.

Figure 3:
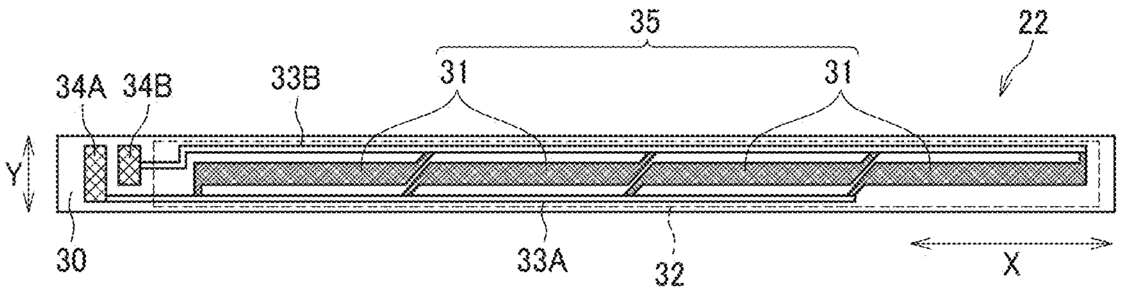
FIG. 3 is a plan view of a heater.

Next, a more detailed configuration of the heater disposed in the above-described fixing device is described with reference to FIG. 3. FIG. 3 is a plan view of the heater according to the present embodiment.

As illustrated in FIG. 3, the heater 22 includes a planar base 30. On the surface of the base 30, a plurality of resistive heat generators 31 (four resistive heat generators 31), power supply lines 33A and 33B that are conductors, a first electrode 34A, and a second electrode 34B are disposed. However, the number of resistive heat generators 31 is not limited to four in the present embodiment. Hereinafter, the power supply lines 33A and 33B are also referred to as power supply lines 33, and the first electrode 34A and the second electrode 34B are also referred to as electrodes 34.

In the present embodiment, the longitudinal direction X of the heater 22 and the like that is the direction perpendicular to the surface of the paper on which FIG. 2 is drawn is also an arrangement direction in which the plurality of resistive heat generators 31 are arranged as illustrated in FIG. 3. In addition, a vertical direction Y in FIG. 3 is also a direction that intersects the arrangement direction. In particular, in the present embodiment, the vertical direction Y in FIG. 3 is also the direction that intersects the arrangement direction of the plurality of resistive heat generators 31 and is different from a thickness direction of the base 30. The vertical direction Y is also a short-side direction of the heater 22 and a sheet conveyance direction of the sheet P passing through the fixing device 9. Hereinafter, the direction Y is also simply referred to as the short-side direction.

The plurality of resistive heat generators 31 configure a plurality of heat generation portions 35 divided in the longitudinal direction. The resistive heat generators 31 are electrically coupled in parallel to a pair of electrodes 34A and 34B via the power supply lines 33A and 33B. The pair of electrodes 34A and 34B is disposed on one end of the base 30 in the longitudinal direction that is a left end of the base 30 in FIG. 3. The power supply lines 33A and 33B are made of conductors having an electrical resistance value smaller than an electrical resistance value of the resistive heat generator 31. A gap area between neighboring resistive heat generators 31 is preferably 0.2 mm or more, more preferably 0.4 mm or more from the viewpoint of maintaining the insulation between the neighboring resistive heat generators 31. If the gap area between the neighboring resistive heat generators 31 is too large, the gap area is likely to cause temperature decrease in the gap area. Accordingly, from the viewpoint of reducing the temperature unevenness in the longitudinal direction, the gap area is preferably equal to or shorter than 5 mm, and more preferably equal to or shorter than 1 mm.

The resistive heat generator 31 is made of a material having a positive temperature coefficient (PTC) of resistance that is a characteristic that the resistance value increases to decrease the heater output as the temperature T increases.

Dividing the heat generation portion 35 configured by the resistive heat generators 31 having the PTC characteristic in the longitudinal direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 outside the small sheet increases because the small sheet does not absorb heat of the fixing belt 20 in the region outside the small sheet that is the region outside the width of the small sheet. Since a constant voltage is applied to the resistive heat generators 31, the temperature increase in the regions outside the width of the small sheets causes the increase in resistance values of the resistive heat generators 31. The temperature increase relatively reduces outputs (that is, heat generation amounts) of the heater in the regions, thus restraining an increase in temperature in the regions that are end portions of the fixing belt outside the small sheets. Electrically coupling the plurality of resistive heat generators 31 in parallel can restrain temperature rises in non-sheet passing regions while maintaining the print speed. Heat generators that configure the heat generation portion 35 may not be the resistive heat generators each having the PTC characteristic. The resistive heat generators in the heater 22 may be arranged in a plurality of rows arranged in the short-side direction.

The resistive heat generators 31 arranged in the longitudinal direction reduces the increase in temperature in the regions that are end portions of the fixing belt outside the small sheets and can reduce the temperature unevenness of the fixing belt 20 in the longitudinal direction. Since the rigidity of the fixing belt 20 changes depending on the temperature thereof, the fixing belt 20 having small temperature unevenness in the longitudinal direction is advantageous in ensuring stable contact with the conductor 40. Accordingly, since the conductor 40 can be in the stable contact with the fixing belt 20, the configuration including the resistive heat generators 31 arranged in the longitudinal direction in the above-described embodiment is preferable. Similarly, a configuration including the first high thermal conduction member 28 and a second high thermal conduction member 36, which is described below, is preferable. In a case in which the conductor 40 is set without using a fastener such as the screw, the above-described configurations are advantageous from the viewpoint of stably bringing the conductor 40 into contact with the fixing belt 20.

The resistive heat generators 31 are produced, for example, as below. Silver-palladium (AgPd), glass powder, and the like are mixed to make paste. The paste is coated to the base 30 by screen printing or the like. Thereafter, the base 30 is subject to firing. Then, the resistive heat generators 31 are produced. The resistive heat generators 31 each have a resistance value of 80Ω at room temperature, in the present embodiment. The material of the resistive heat generators 31 may contain a resistance material, such as silver alloy (AgPt) or ruthenium oxide ($RuO_2$), other than the above material. Silver (Ag), silver palladium (AgPd) may be used as a material of the power supply lines 33A and 33B and the electrodes 34A and 34B. Screen-printing such a material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment includes an alumina base having a thickness of 1.0 mm, a width of 270 mm in the longitudinal direction, and a width of 8 mm in the short-side direction. Alternatively, the base 30 may be made by layering the insulation material on conductive material such as metal. Low-cost aluminum or stainless steel is favorable as the metal material of the base 30. The base 30 made of a stainless steel plate is resistant to cracking due to thermal stress. To improve thermal uniformity of the heater 22 and image quality, the base 30 may be made of a material having high thermal conductivity, such as copper, graphite, or graphene.

The insulation layer 32 may be, for example, a thermal resistance glass having a thickness of 75 μm. The insulation layer 32 covers the resistive heat generators 31 and the power supply lines 33A and 33B to insulate and protect the resistive heat generators 31 and the power supply lines 33A and 33B and maintain sliding performance with the fixing belt 20.

Figure 4:
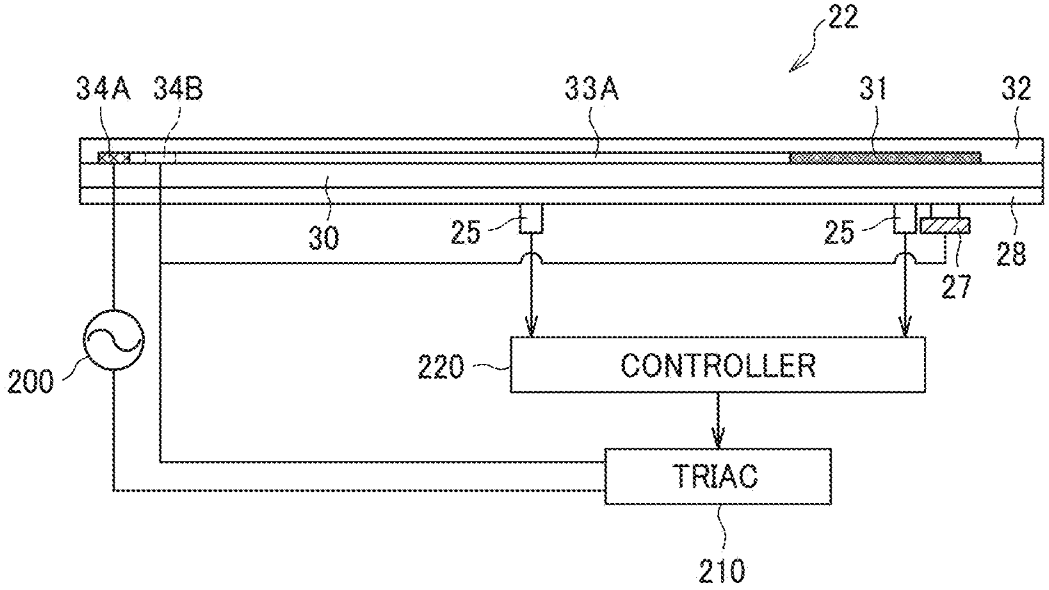
FIG. 4 is a schematic diagram illustrating a circuit to supply power to the heater of FIG. 3.

FIG. 4 is a schematic diagram illustrating a circuit to supply power to the heater according to the present embodiment.

As illustrated in FIG. 4, an alternating current power supply 200 is electrically coupled to the electrodes 34A and 34B of the heater 22 to configure a power supply circuit in the present embodiment to supply power to the resistive heat generators 31. The power supply circuit includes a triac 210 that controls an amount of power supplied. A controller 220 controls the amount of power supplied to the resistive heat generators 31 via the triac 210 based on temperatures detected by the thermistors 25. The controller 220 includes a microcomputer including, for example, a central processing unit (CPU), a read only memory (ROM), a random access memory (RAM), and an input and output (I/O) interface.

In the present embodiment, one thermistor 25 is disposed in the central region of the heater 22 in the longitudinal direction that is the region inside a sheet conveyance span for the smallest sheet, and the other thermistor 25 is disposed in one end portion of the heater 22 in the longitudinal direction. A thermostat 27 as a power cut-off device is disposed in the one end portion of the heater 22 in the longitudinal direction and cuts off power supply to the resistive heat generators 31 when the temperature of the resistive heat generator 31 becomes a predetermined temperature or higher. The thermistors 25 and the thermostat 27 contact the first high thermal conduction member 28 to detect the temperature of the first high thermal conduction member 28.

As described above, the fixing device 9 includes the heater 22 including the resistive heat generators 31 through which the current flows to generate heat, and the heater 22 is in contact with the inner circumferential surface of the fixing belt 20. A lightning strike causes a common mode surge in a commercial power supply. A surge current is an excessive current. The excessive current may flow through the insulation layer of the heater 22, and the insulation layer may be damaged.

The following describes a configuration of the present embodiment for preventing the above-described damage of the insulation layer.

The fixing device 9 includes a conductor 40. The conductor 40 has a sheet shape. The conductor 40 is made of conductive material. The conductor 40 in the present embodiment is made of conductive polyimide in which carbon black is added. The conductor 40 is grounded via the stay 24, the resistor 41, and the housing of the fixing device 9. The conductor 40 is coupled in series with the resistor 41. A plurality of conductors 40 may be arranged in the longitudinal direction, or one conductor 40 may be disposed.

The conductor 40 has one end 40*a* that is a free end. The end 40*a* is a contact portion in contact with the inner circumferential surface of the fixing belt 20. The contact of the one end 40*a* with the inner circumferential surface of the fixing belt 20 enables the charge on the fixing belt 20 to pass to the ground through the stay 24 and the resistor 41, removing the charge accumulated on the fixing belt 20.

The conductor 40 is disposed between the stay 24 and the guide portion 26 and is fixed to the right-angle portion 24*a* by a screw 42 as the fastener. The above-described configuration can surely bring the conductor 40 into contact with the stay 24 to ground the conductor 40 via the stay 24. The right-angle portion 24*a* of the stay 24 has a fastening hole 24*b* to fix the screw 42.

The resistance value of the conductor 40 is set to 100 kΩ or more. In addition, the resistance value of the resistor 41 is set to 100 kΩ or more. The above-described resistance values can limit a current passing through the conductor 40 and the resistor 41 in the image forming apparatus using the power supply voltage of 100 v to be 1.0 mA or less that is defined in Appended table 12 of Electrical Appliance and Material Safety Act regarding Article 7 (ii) of Ministerial Order to Provide Technical Standards for Electrical Appliances and Materials in Japan. The above-described current value is measured by an ammeter when the power supply applies the voltage to the conductor 40 and the resistor 41.

Figure 5:
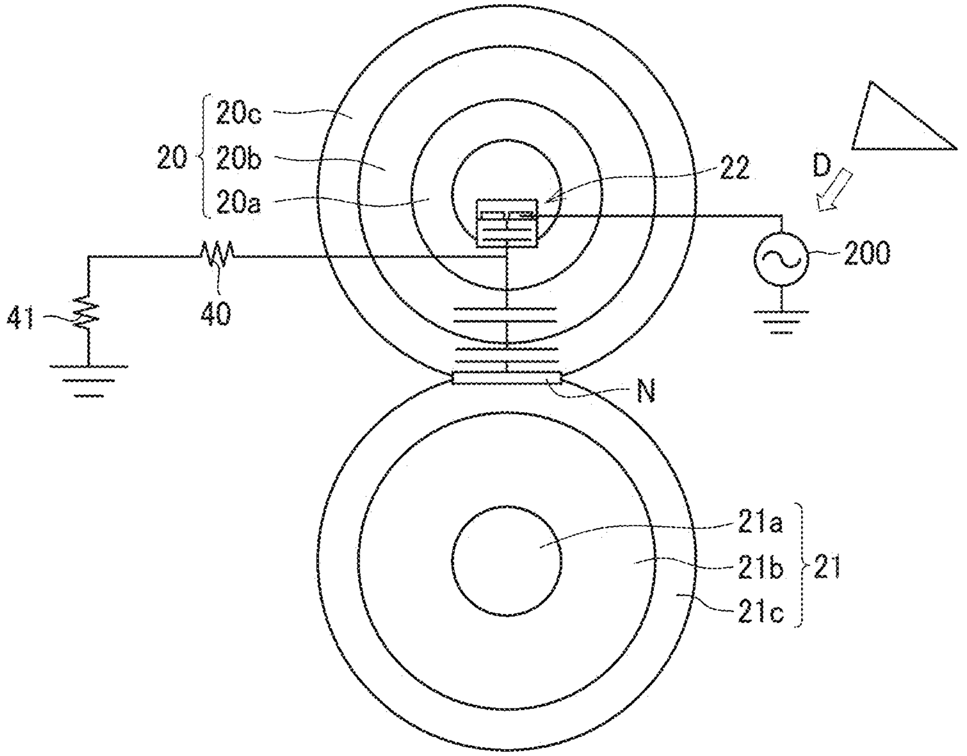
FIG. 5 is a diagram illustrating a conductive path around a fixing belt in the fixing device of FIG. 2.

FIG. 5 is a diagram illustrating a conductive path around a fixing belt in the fixing device 9 of FIG. 2. FIG. 5 schematically illustrates each layer of the fixing belt, and dimensions such as thickness thereof are different from those of FIG. 2.

As illustrated in FIG. 5, the fixing belt 20 includes a base layer 20*a* as a conductive layer, an elastic layer 20*b* as an insulation layer, and a release layer 20*c* as an insulation layer.

Applying a surge voltage to the alternating current power supply 200 causes a current to flow through the insulation layer 32 via a conductor layer of the heater 22. However, the fixing device 9 in the present embodiment includes the conductor 40 and the resistor 41 to flow the current flowing through the insulation layer 32 of the heater 22 to the ground via the base layer 20*a* of the fixing belt 20, the conductor 40, the stay 24, and the resistor 41. Accordingly, the above-described configuration can prevent the insulation layer from being damaged by an excessive voltage that is a voltage higher than expected applied due to lightning or the like. In particular, setting the resistance values of the conductor 40 and the resistor 41 in the present embodiment to be equal to or greater than 100 kΩ can appropriately divide the voltage applied to the insulation layer of the heater 22 and prevent the insulation layer from being damaged. Even if the resistor 41 does not function, for example, a failure of the resistor 41 or occurrence of electric discharge between terminals of the resistor 41, the above-described configuration can prevent the insulation layer from being damaged. In addition, since the above-described configuration does not include a component to prevent a surge, such as a varistor, the above-described configuration can reduce the size and cost of the fixing device.

The conductor 40 formed to be the sheet shape has an advantage. The sheet shape enables reducing the cross-sectional area of the conductor 40 and easily increasing the resistance of the conductor 40.

Preferably, the resistance value of the conductor 40 is larger than the resistance value of the base layer 20*a* of the fixing belt 20. The above-described resistance values enable a divided voltage applied to the base layer 20*a* to be smaller than the divided voltage applied to the conductor 40, preventing the breakage of the base layer 20*a*.

Preferably, the resistance value of the conductor 40 is set to be substantially equal to the resistance value of the resistor 41. Specifically, the resistance value of the conductor 40 is preferably set to be within a range of ±10% of the resistance value of the resistor 41. The above-described resistance values can reduce the difference between the voltage applied to the conductor 40 and the voltage applied to the resistor 41.

Figure 6:
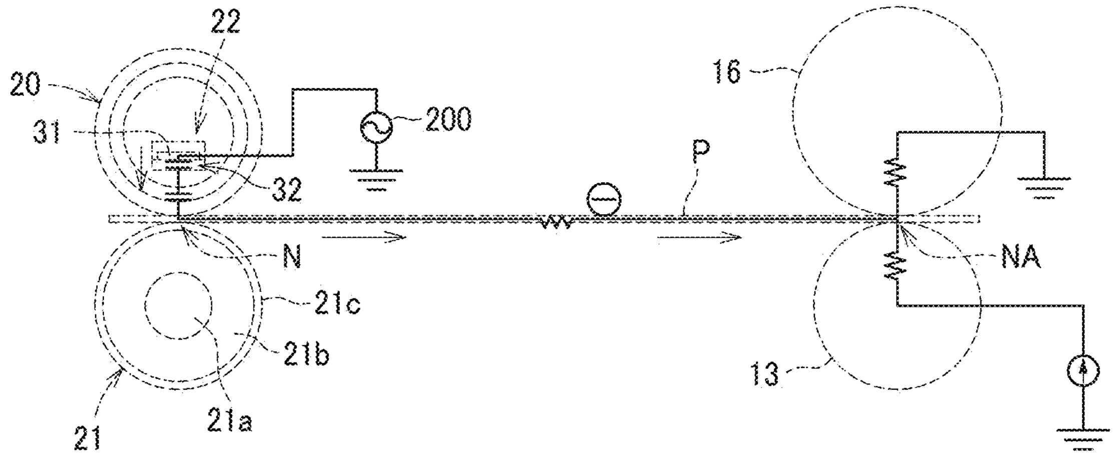
FIG. 6 is a schematic diagram for describing how a banding image is formed.

The above-described fixing device 9 has a disadvantage called a banding image. In the fixing device 9 including the heater 22 to which the AC voltage is applied, the insulation layer in the heater 22 and the surface layer of the fixing belt 20 are equivalent to the capacitors. The fixing belt 20 in contact with the heater 22 applies the AC voltage to the fixing nip N. As illustrated in FIG. 6, the sheet P in contact with both the fixing nip N and the secondary transfer nip NA transmits the AC voltage to the secondary transfer nip NA in a direction indicated by an arrow in FIG. 6. The AC voltage affects the transfer electric field to cause periodic density unevenness in the transferred image that is called the banding image. In particular, in a case where the sheet P has low resistance, for example, in a high-humidity environment or when a thin paper sheet is used as the sheet P, the above-described disadvantage is likely to occur. The secondary transfer nip NA is a nip portion formed between the secondary transfer roller 13 and a secondary-transfer backup roller 16.

In the present embodiment, the conductor 40 in contact with the base layer 20*a* of the fixing belt 20 can pass an alternating current from the fixing nip N to the ground via the fixing belt 20 and the conductor 40. The conductor 40 can prevent the AC voltage from being applied to the secondary transfer nip NA through the sheet P and the banding image from being formed.

In particular, it is preferable that the sum of the resistance value of the conductor 40 and the resistance value of the resistor 41 is 4 MΩ or less. The above-described sum of the resistance values effectively reduces the alternating current flowing from the fixing nip to the secondary transfer nip NA. In addition, the resistance value of the conductor 40 is preferably 2 MΩ or more. As a result, even if one of the conductor 40 and the resistor 41 is damaged, the above-described configuration can obtain the following two effects. One is preventing the damage of the insulation layer 32 of the heater 22 due to the above-described surge voltage. The other one is reducing the alternating current flowing from the fixing nip to the secondary transfer nip NA.

Next, variations of the conductor 40 are described.

Figure 7:
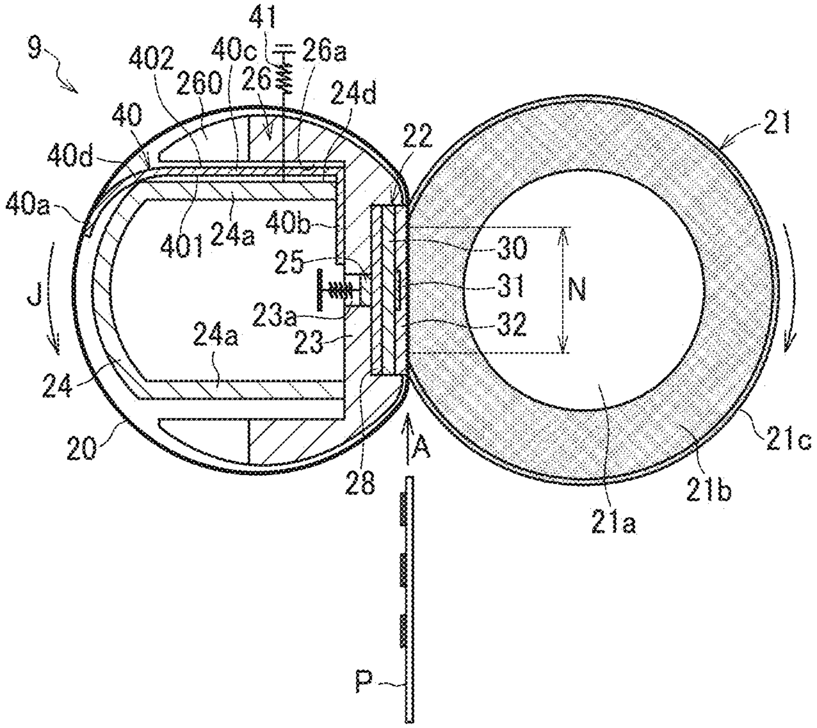
FIG. 7 is a schematic sectional side view of the fixing device different from the fixing device of FIG. 2.

An embodiment illustrated in FIG. 7, the conductor 40 has a facing portion 40*c* facing a first facing surface 24*d* of the stay 24 and a second facing surface 26*a* of the guide portion 26. The first facing surface 24*d* and the second facing surface 26*a* regulate the inclination of the conductor 40 in the vertical direction of FIG. 7.

The conductor 40 has the other end 40*b* that is bent from the facing portion 40*c*. The facing portion 40*c* of the conductor 40 is interposed between the one end 40*a* and the other end 40*b*. A portion including the other end 40*b* is sandwiched by the right-angle portion 24*a* of the stay 24 and the heater holder 23 in the lateral direction of FIG. 7. As a result, the pressing force of the pressure roller 21 surely supports the conductor 40 interposed between the stay 24 and the heater holder 23. The above-described configuration can surely position the other end 40*b* of the conductor 40 with respect to the stay 24. The above-described configuration can surely bring the conductor 40 into contact with the stay 24 to ground the conductor 40 via the stay 24. The stay 24 and the heater holder 23 can hold the conductor 40.

Figure 8:
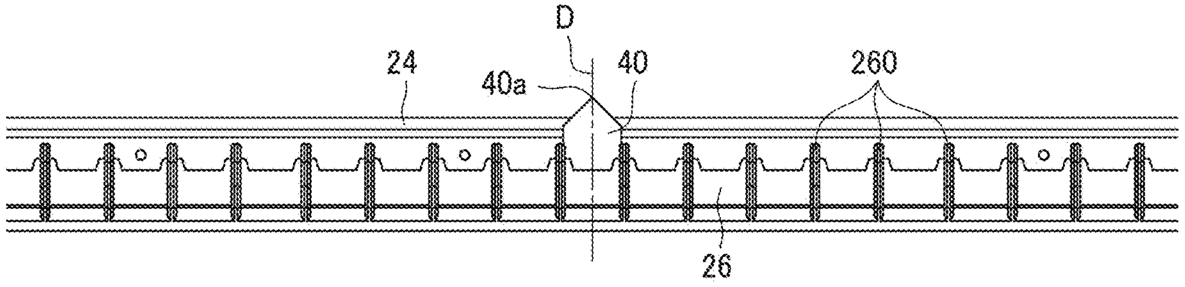
FIG. 8 is a schematic view of a conductor, a stay, and a guide portion, illustrating a location of the conductor in a longitudinal direction.
Figure 9:
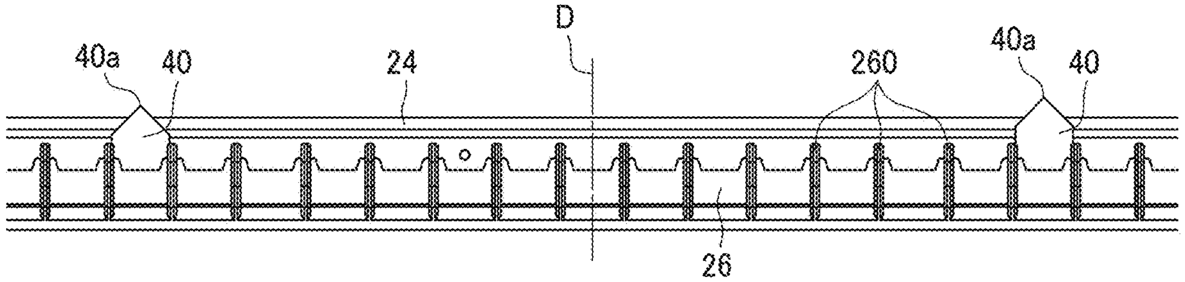
FIG. 9 is a schematic view of the conductor, the stay, and a guide portion, illustrating a location of the conductor in the longitudinal direction, which is different from the location of FIG. 8.

As illustrated in FIG. 8, the one end 40*a* of the conductor 40 in contact with the fixing belt 20 is preferably at a position facing the center position D of the fixing belt 20 in the longitudinal direction of the fixing belt 20 or at a position in the vicinity of the position facing the center position D. At the position at which the conductor 40 is in contact with the fixing belt 20, sliding friction occurs between the fixing belt 20 and the conductor 40. The conductor 40 disposed at one end of both ends of the fixing belt 20 in the longitudinal direction of the fixing belt 20 generates a deviation in the sliding friction between the one end of the fixing belt 20 and the other end of the fixing belt 20 in the longitudinal direction, which causes a skew of the fixing belt 20. The skew causes a breakage of the fixing belt 20. The conductor 40 positioned as in the present embodiment can prevent the breakage of the fixing belt 20 caused by the skew of the fixing belt 20. In a case in which a plurality of conductors 40 are disposed as illustrated in FIG. 9, the conductors are preferably disposed to face one end of the fixing belt 20 and the other end of the fixing belt 20 in the longitudinal direction so that one position at which the one end of the inner surface of the fixing belt 20 is in contact with the conductor 40 is substantially symmetrical to the other position at which the other end of the inner surface of the fixing belt 20 is in contact with the conductor 40 with respect to the center position D. The above-described configuration can prevent the damage of the fixing belt 20 caused by the skew of the fixing belt 20. However, the positions of the conductors 40 in the longitudinal direction are not limited to the above.

Figure 10:
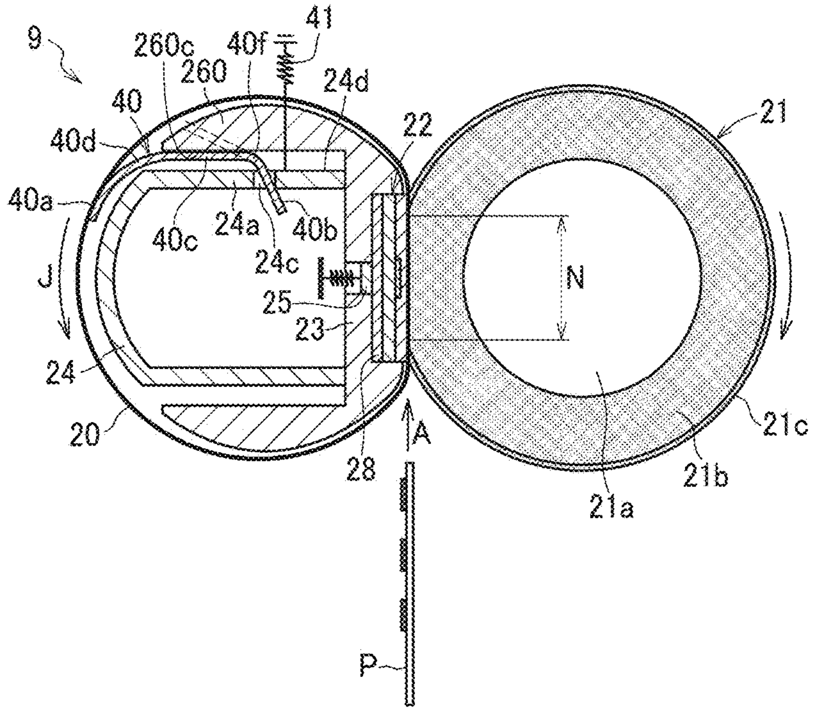
FIG. 10 is a cross-sectional side view of the fixing device that is different from the fixing devices illustrated in FIGS. 2 and 7.

In an embodiment illustrated in FIG. 10, the stay 24 has a locking hole 24*c* as an opening.

The other end 40*b* of the conductor 40 is bent and inserted into the locking hole 24*c* to attach the conductor 40 to the stay 24. However, a member having the locking hole is not limited to the stay.

Figure 11:
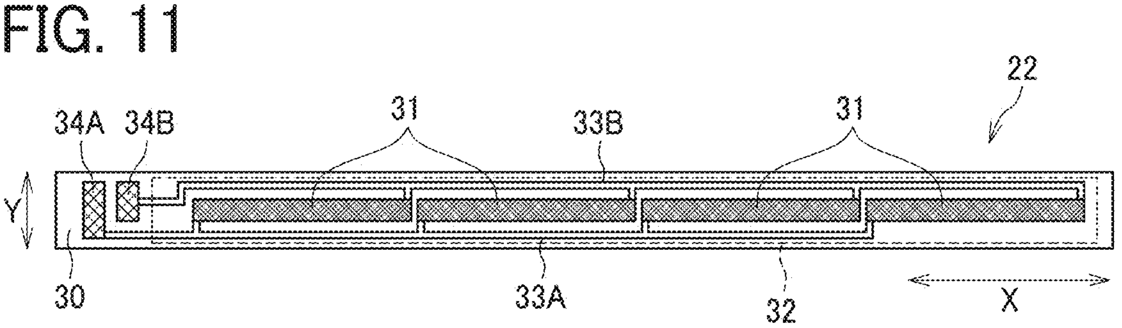
FIG. 11 is a plan view of the heater including resistive heat generators each having a form different from a form of the resistive heat generator illustrated in FIG. 3.
Figure 12:
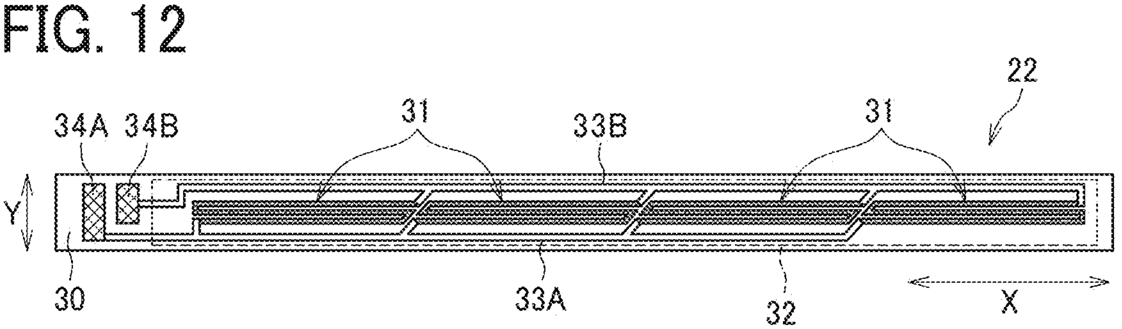
FIG. 12 is a plan view of the heater including resistive heat generators each having a form different from each of the forms of the resistive heat generators illustrated in FIGS. 3 and 11.

An arrangement of parts in the conductor layer of the heater 22 is not limited to the arrangement illustrated in FIG. 3. For example, FIG. 3 illustrates the first electrode 34A and the second electrode 34B disposed on the same end portion of the base 30 in the longitudinal direction, but the first electrode 34A and the second electrode 34B may be disposed on both end portions of the base 30 in the longitudinal direction. The shape of resistive heat generator 31 is not limited to the shape in the present embodiment. For example, as illustrated in FIG. 11, the shape of resistive heat generator 31 may be a rectangular shape, or as illustrated in FIG. 12, the resistive heat generator 31 may be configured by a linear portion folding back to form a substantially parallelogram shape. In addition, as illustrated in FIG. 11, portions each extending from the resistive heat generator 31 having a rectangular shape to one of the power supply lines 33A and 33B (the portion extending in the short-side direction) may be a part of the resistive heat generator 31 or may be made of the same material as the power supply lines 33A and 33B.

Figure 13A:
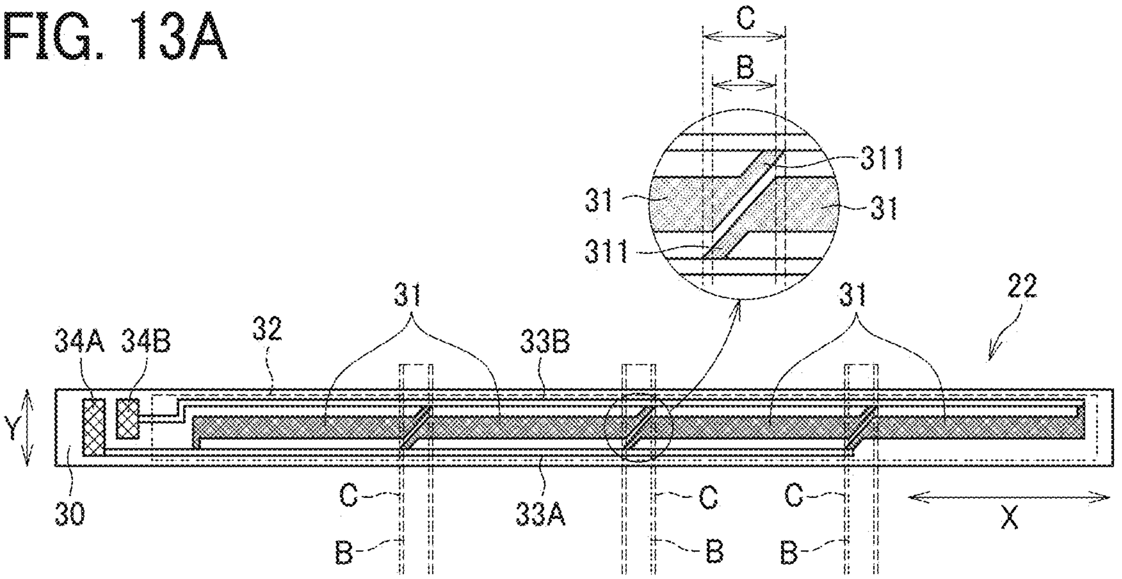
FIG. 13A is a plan view of the heater of FIG. 3.
Figure 13B:
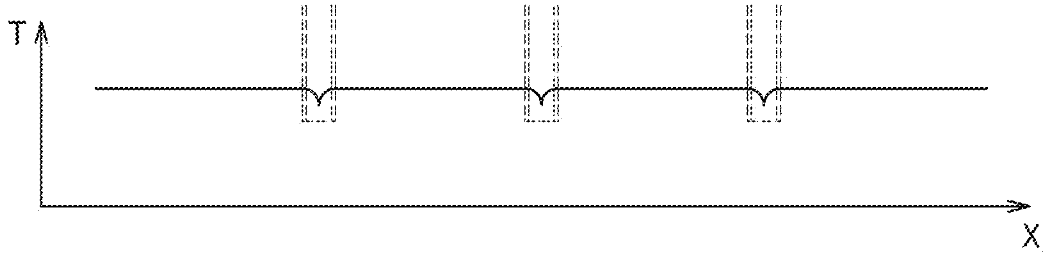
FIG. 13B is a graph illustrating a temperature distribution of the fixing belt in an arrangement direction of the resistive heat generators of the heater of FIG. 3.

FIG. 13A is a plan view of the heater including the resistive heat generators of FIG. 3. FIG. 13B is a graph illustrating a temperature distribution of the fixing belt 20 in the longitudinal direction of the fixing belt 20. FIG. 13A illustrates the arrangement of the resistive heat generators 31 of the heater 22. In the graph of FIG. 13B, a vertical axis represents the temperature T of the fixing belt 20, and a horizontal axis represents the position of the fixing belt 20 in the longitudinal direction.

As illustrated in FIG. 13A, the plurality of resistive heat generators 31 of the heater 22 are separated from each other in the longitudinal direction to form separation areas B including gap areas between the neighboring resistive heat generators 31. In other words, the heater 22 has gap areas between the plurality of resistive heat generators 31. As illustrated in an enlarged view of FIG. 13A, the separation area B includes the entire gap area sandwiched by the adjoining resistive heat generators 31. In addition, the separation area B includes parts of the resistive heat generators sandwiched between lines extending in a direction orthogonal to the longitudinal direction from both ends of the gap area in the longitudinal direction. The area occupied by the resistive heat generators 31 in the separation area B is smaller than the area occupied by the resistive heat generators 31 in another area of the heat generation portion 35, and the amount of heat generated in the separation area B is smaller than the amount of heat generated in another area of the heat generation portion. As a result, the temperature of the fixing belt 20 corresponding to the separation area B becomes smaller than the temperature of the fixing belt 20 corresponding to another area, which causes temperature unevenness in the longitudinal direction of the fixing belt 20 as illustrated in FIG. 13B. Similarly, the temperature of the heater 22 corresponding to the separation area B becomes smaller than the temperature of the heater 22 corresponding to another area of the heat generation portion 35. In addition to the separation area B, the heater 22 has an enlarged separation area C including areas corresponding to connection portions 311 of the resistive heat generators 31 and the separation area B as illustrated in the enlarged view of FIG. 13A. The connection portion 311 is defined as a portion of the resistive heat generator 31 that extends in the short-side direction and is connected to one of the power supply lines 33A and 33B. Similar to the separation area B, the temperature of the heater 22 corresponding to the enlarged separation area C and the temperature of the fixing belt 20 corresponding to the enlarged separation area C are smaller than the temperatures of the heater 22 and the fixing belt 20 corresponding to another area of the heat generation portion 35.

Figure 14:
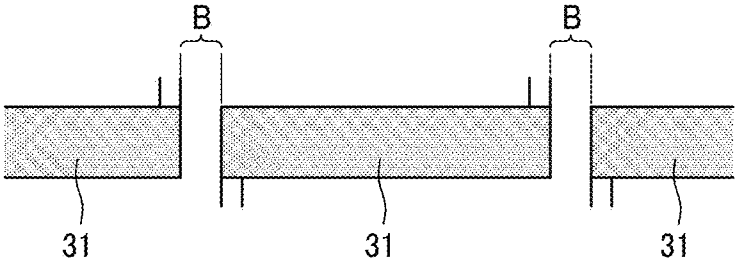
FIG. 14 is a diagram illustrating separation areas of the heater of FIG. 11.
Figure 15:
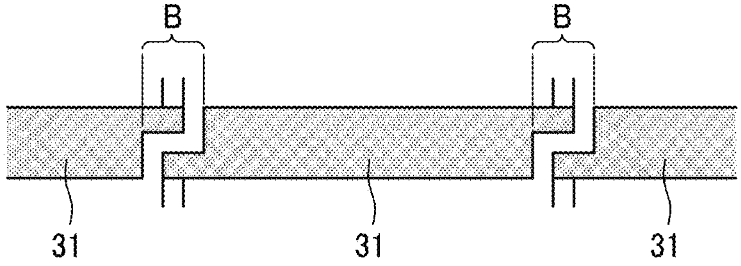
FIG. 15 is a diagram illustrating separation areas each having a form different from the form of the separation area of FIG. 14.
Figure 16:
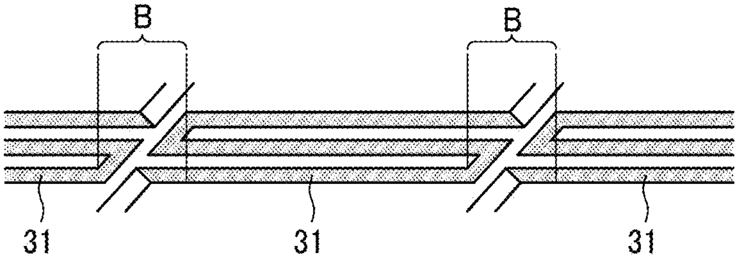
FIG. 16 is a diagram illustrating separation areas of the heater of FIG. 12.

As illustrated in FIG. 14, the heater 22 including the rectangular resistive heat generators 31 illustrated in FIG. 11 also has the separation areas B having lower temperatures than another area of the heat generation portion 35. In addition, the heater 22 including the resistive heat generators 31 having forms as illustrated in FIG. 15 has the separation areas B with lower temperatures than another area of the heat generation portion 35. As illustrated in FIG. 16, the heater 22 including the resistive heat generators 31 having forms as illustrated in FIG. 12 has the separation areas B with lower temperatures than another area of the heat generation portion 35. However, overlapping the resistive heat generators 31 lying next to each other in the longitudinal direction as illustrated in FIGS. 13, 15, and 16 can reduce the above-described temperature drop that the temperature of the fixing belt 20 corresponding to the separation area B is smaller than the temperature of the fixing belt 20 corresponding to an area other than the separation area B.

The fixing device 9 in the present embodiment includes the first high thermal conduction member 28 described above in order to reduce the temperature drop corresponding to the separation area B as described above and reduce the temperature unevenness in the longitudinal direction of the fixing belt 20. Next, a detailed description is given of the first high thermal conduction member 28.

As illustrated in FIG. 2, the first high thermal conduction member 28 is disposed between the heater 22 and the stay 24 in the lateral direction of FIG. 2 and is particularly sandwiched between the heater 22 and the heater holder 23. One side of the first high thermal conduction member 28 is brought into contact with the back surface of the base 30, and the other side of the first high thermal conduction member 28 is brought into contact with the heater holder 23.

The stay 24 has two right-angle portions 24*a* extending in a thickness direction of the heater 22 and each having a contact surface that contacts the back side of the heater holder 23 or contacts the back side of the heater holder 23 via the conductor 40 to support the heater holder 23, the first high thermal conduction member 28, and the heater 22. In the short-side direction that is the vertical direction in FIG. 2, the contact surfaces are outside the resistive heat generators 31. The above-described structure prevents heat transfer from the heater 22 to the stay 24 and enables the heater 22 to effectively heat the fixing belt 20.

As illustrated in FIG. 17, the first high thermal conduction member 28 is a plate having a thickness of 0.3 mm, a length of 222 mm in the longitudinal direction, and a width of 10 mm in the short-side direction. In the present embodiment, the first high thermal conduction member 28 is made of a single plate but may be made of a plurality of members. In FIG. 17, the guide portion 26 and the guide rib 260 in FIG. 2 are omitted.

The first high thermal conduction member 28 is fitted into a recessed portion 23*b* of the heater holder 23, and the heater 22 is mounted thereon. Thus, the first high thermal conduction member 28 is sandwiched and held between the heater holder 23 and the heater 22. In the present embodiment, the length of the first high thermal conduction member 28 in the longitudinal direction is substantially the same as the length of the heater 22 in the longitudinal direction. Both side walls 23*b*1 forming the recessed portion 23*b* in the longitudinal direction restrict movement of the heater 22 and movement of the first high thermal conduction member 28 in the longitudinal direction and work as longitudinal direction regulators. Reducing the positional deviation of the first high thermal conduction member 28 in the longitudinal direction in the fixing device 9 improves the thermal conductivity efficiency with respect to a target range in the longitudinal direction. In addition, both side walls 23*b*2 forming the recessed portion 23*b* in the short-side direction restricts movement of the heater 22 and movement of the first high thermal conduction member 28 in the short-side direction.

Figure 18:
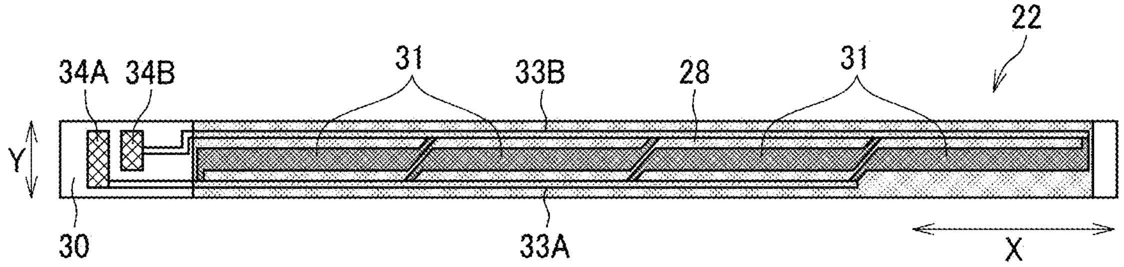
FIG. 18 is a plan view of the heater to illustrate a setting of the first high thermal conduction member.
Figure 19:
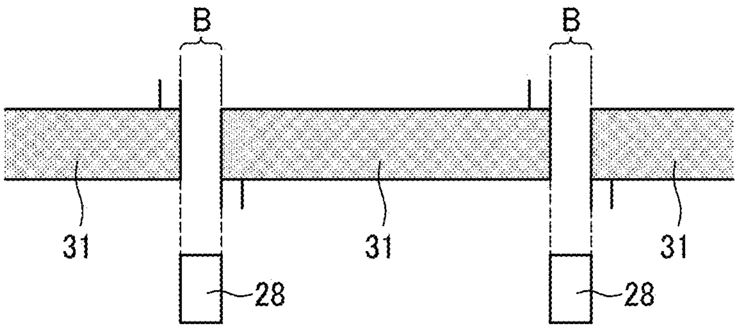
FIG. 19 is a schematic diagram illustrating another example of the setting of the first high thermal conduction members in the heater.

The range in which the first high thermal conduction member 28 is disposed in the longitudinal direction is not limited to the above. For example, as illustrated in FIG. 18, the first high thermal conduction member 28 may be disposed so as to face a range corresponding to the heat generation portion 35 in the longitudinal direction (see a hatched portion in FIG. 18). As illustrated in FIG. 19, the first high thermal conduction member 28 may face the entire gap area between the resistive heat generators 31. In FIG. 19, for the sake of convenience, the resistive heat generator 31 and the first high thermal conduction member 28 are shifted in the vertical direction of FIG. 19 but are disposed at substantially the same position in the short-side direction. However, the present disclosure is not limited to the above. The first high thermal conduction member 28 may be disposed to face a part of the resistive heat generators 31 in the short-side direction or may be disposed so as to cover the entire resistive heat generators 31 in the short-side direction as illustrated in FIG. 20, which is described below.

Figure 20:
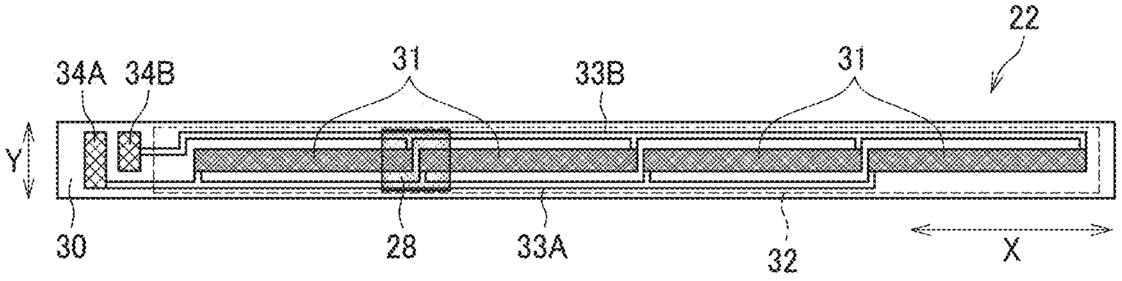
FIG. 20 is a plan view of the heater having a further different setting of the first high thermal conduction member.

As illustrated in FIG. 20, the first high thermal conduction member 28 may be face a part of each of the neighboring resistive heat generators 31 in addition to the gap area between the neighboring resistive heat generators 31. The first high thermal conduction member 28 may be disposed to face all separation areas B in the heater 22, one separation area B as illustrated in FIG. 20, or some of separation areas B. At least a part of the first high thermal conduction member 28 may be disposed to face the separation area B.

Due to the pressing force of the pressure roller 21, the first high thermal conduction member 28 is sandwiched between the heater 22 and the heater holder 23 and is brought into close contact with the heater 22 and the heater holder 23. Bringing the first high thermal conduction member 28 into contact with the heaters 22 improves the heat conduction efficiency in the longitudinal direction of the heaters 22. The first high thermal conduction member 28 facing the separation area B improves the heat conduction efficiency of a part of the heater 22 facing the separation area B in the longitudinal direction, transmits heat to the part of the heater 22 facing the separation area B, and raise the temperature of the part of the heater 22 facing the separation area B. As a result, the first high thermal conduction member 28 reduces the temperature unevenness in the longitudinal direction of the heaters 22. Thus, temperature unevenness in the longitudinal direction of the fixing belt 20 is reduced. Therefore, the above-described structure prevents fixing unevenness and gloss unevenness in the image fixed on the sheet. Since the heater 22 does not need to generate additional heat to secure sufficient fixing performance in the part of the heater 22 facing the separation area B, energy consumption of the fixing device 9 can be saved. The first high thermal conduction member 28 disposed over the entire area of the heat generation portion 35 in the longitudinal direction improves the heat transfer efficiency of the heater 22 over the entire area of a main heating region of the heater 22, that is, an area facing an image formation area of the sheet passing through the fixing device and reduces the temperature unevenness of the heater 22 and the temperature unevenness of the fixing belt 20 in the longitudinal direction.

In the present embodiment, the combination of the first high thermal conduction member 28 and the resistive heat generator 31 having the PTC characteristic described above efficiently prevents overheating the non-sheet passing region (that is the region of the fixing belt outside the small sheet) of the fixing belt 20 when small sheets pass through the fixing device 9. Specifically, the PTC characteristic reduces the amount of heat generated by the resistive heat generator 31 in the non-sheet passing region, and the first high thermal conduction member effectively transfers heat from the non-sheet passing region in which the temperature rises to a sheet passing region that is a region of the fixing belt contacting the sheet. As a result, the overheating of the non-sheet passing region is effectively prevented.

The first high thermal conduction member 28 may be disposed opposite an area around the separation area B because the small heat generation amount in the separation area B decreases the temperature in the area around the separation area B. For example, the first high thermal conduction member 28 facing the enlarged separation area C (see FIG. 13A) particularly improves the heat transfer efficiency of the separation area B and the area around the separation area B in the longitudinal direction and reduces the temperature unevenness of the heater 22 in the longitudinal direction. In particular, the first high thermal conduction member 28 facing the entire region of the heat generation portion 35 in the longitudinal direction reduces the temperature unevenness of the heater 22 (and the fixing belt 20) in the longitudinal direction.

Next, different embodiments of the fixing device are described.

Figure 21:
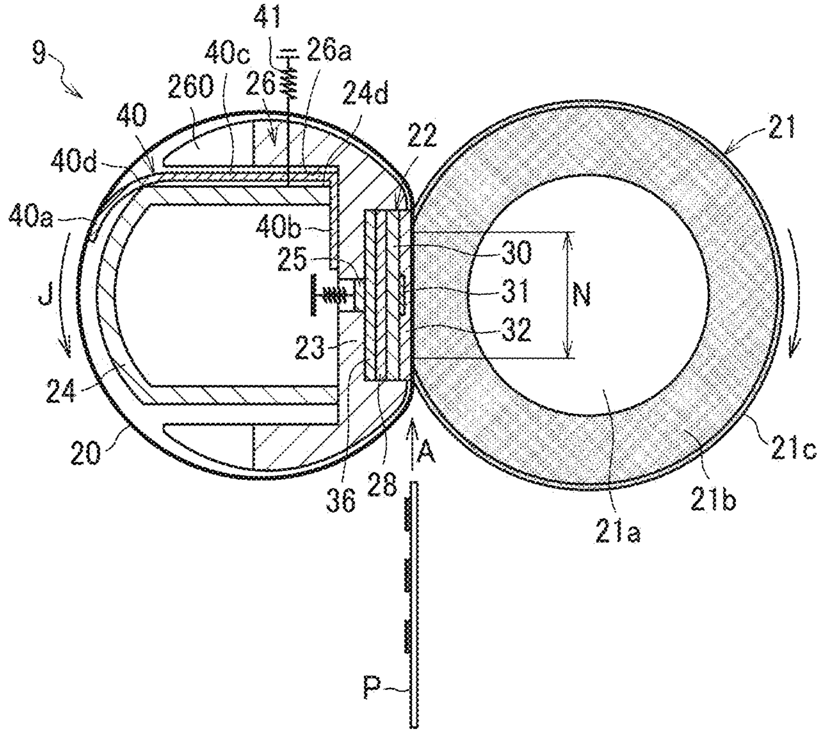
FIG. 21 is a schematic sectional side view of the fixing device according to an embodiment different from FIG. 2.

As illustrated in FIG. 21, the fixing device 9 according to the present embodiment includes a second high thermal conduction member 36 between the heater holder 23 and the first high thermal conduction member 28. The second high thermal conduction member 36 is disposed at a position different from the position of the first high thermal conduction member 28 in the lateral direction in FIG. 21 that is a direction in which the heater holder 23, the stay 24, and the first high thermal conduction member 28 are layered. Specifically, the second high thermal conduction member 36 is disposed so as to overlap the first high thermal conduction member 28. FIG. 21 illustrates a schematic cross section of the fixing device 9 including the second high thermal conduction member 36, and the position of the schematic cross section illustrated in FIG. 21 is different from the position of the thermistor 25 in the longitudinal direction at which the schematic cross section illustrated in FIG. 2.

The second high thermal conduction member 36 is made of a material having thermal conductivity higher than the thermal conductivity of the base 30, for example, graphene or graphite. In the present embodiment, the second high thermal conduction member 36 is made of a graphite sheet having a thickness of 1 mm. Alternatively, the second high thermal conduction member 36 may be a plate made of aluminum, copper, silver, or the like.

Figure 22:
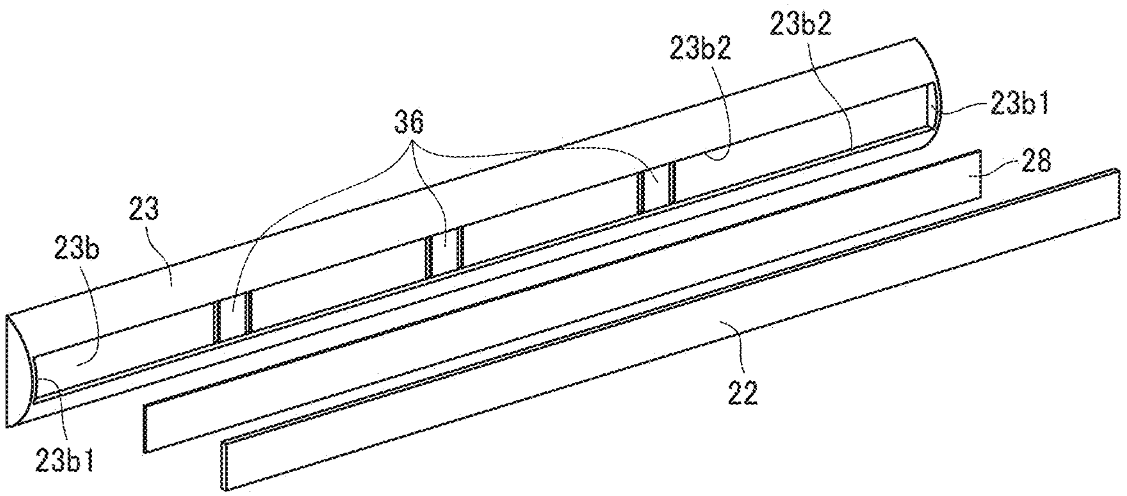
FIG. 22 is a perspective view of the heater, the first high thermal conduction member, a second high thermal conduction member, and the heater holder.

As illustrated in FIG. 22, a plurality of the second high thermal conduction members 36 are disposed on a plurality of portions of the heater holder 23 in the longitudinal direction. The recessed portion 23*b* of the heater holder 23 has a plurality of holes in which the second high thermal conduction members 36 are disposed. Clearances are formed between the heater holder 23 and both sides of the second high thermal conduction member 36 in the longitudinal direction. The clearance prevents heat transfer from both ends of the second high thermal conduction member 36 in the longitudinal direction to the heater holder 23, and the heater 22 can efficiently heat the fixing belt 20. In FIG. 22, the guide portion 26 in FIG. 2 is omitted.

Figure 23:
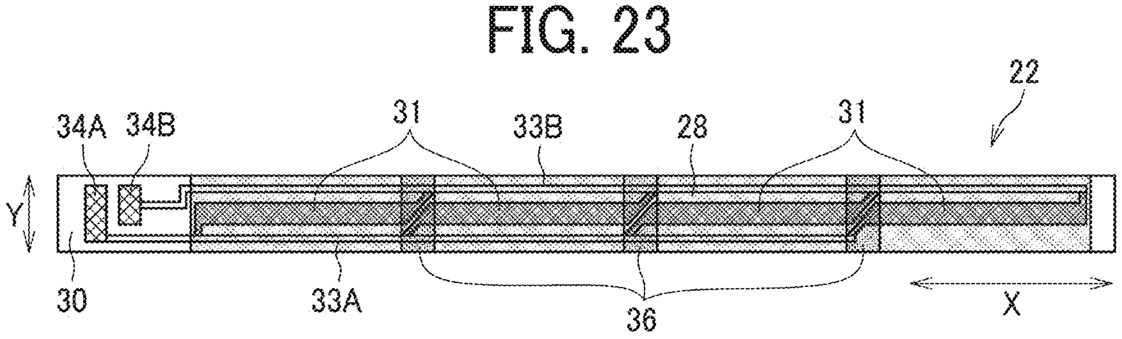
FIG. 23 is a plan view of the heater to illustrate an arrangement of the first high thermal conduction member and the second high thermal conduction member.
Figure 27:
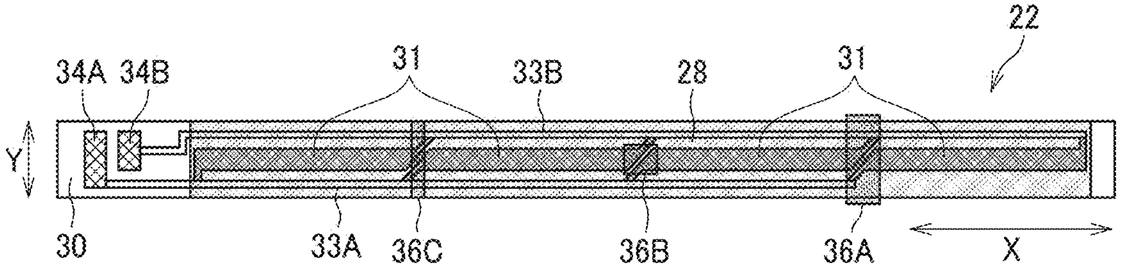
FIG. 27 is a plan view of the heater having a different arrangement of the second high thermal conduction member from the arrangement in FIG. 23.

As illustrated in FIG. 23, each of the second high thermal conduction members 36 (see the hatched portions) is disposed at a position corresponding to the separation area B in the longitudinal direction and faces at least a part of each of the neighboring resistive heat generators 31 in the longitudinal direction. In particular, each of the second high thermal conduction members 36 in the present embodiment faces the entire separation area B. In FIG. 23 and FIG. 27 to be described later, the first high thermal conduction member 28 faces the heat generation portion 35 extending in the longitudinal direction, but the first high thermal conduction member 28 according to the present embodiment is not limited this as described above.

Figure 24:
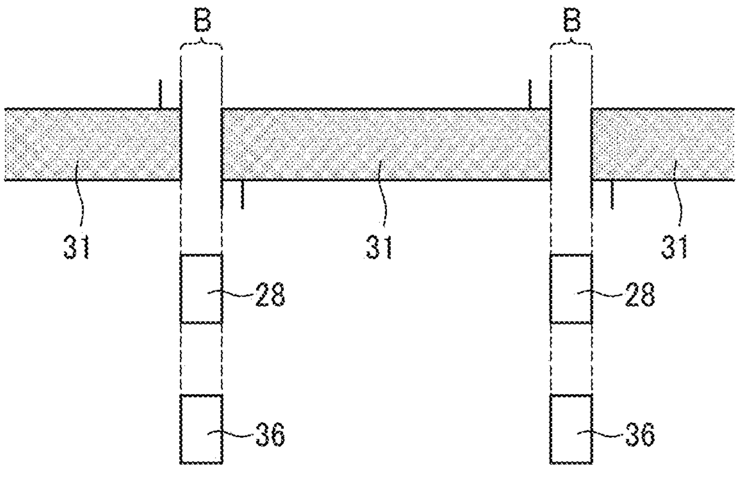
FIG. 24 is a schematic diagram illustrating a different arrangement of the first high thermal conduction members and the second high thermal conduction members from the arrangement in FIG. 23.

The fixing device 9 according to the present embodiment includes the second high thermal conduction member 36 disposed at the position corresponding to the separation area B in the longitudinal direction and the position at which at least a part of each of the neighboring resistive heat generators 31 faces the second high thermal conduction member 36 in addition to the first high thermal conduction member 28. The above-described structure particularly improves the heat transfer efficiency in the separation area B in the longitudinal direction and further reduces the temperature unevenness of the heater 22 in the longitudinal direction. As illustrated in FIG. 24, the first high thermal conduction members 28 and the second high thermal conduction member 36 may be disposed opposite the entire gap area between the resistive heat generators 31. The above-described structure improves the heat transfer efficiency of the part of the heater 22 corresponding to the gap area to be higher than the heat transfer efficiency of the other part of the heater 22. In FIG. 24, for the sake of convenience, the resistive heat generator 31, the first high thermal conduction member 28, and the second high thermal conduction member 36 are shifted in the vertical direction of FIG. 24 but are disposed at substantially the same position in the short-side direction. The present disclosure is not limited to the above. The first high thermal conduction member 28 and the second high thermal conduction member 36 may be disposed opposite a part of the resistive heat generators 31 in the short-side direction.

In one embodiment different from the embodiments described above, each of the first high thermal conduction member 28 and the second high thermal conduction member 36 is made of a graphene sheet. The first high thermal conduction member 28 and the second high thermal conduction member 36 made of the graphene sheet have high thermal conductivity in a predetermined direction along the plane of the graphene, that is, not in the thickness direction but in the longitudinal direction. Accordingly, the above-described structure can effectively reduce the temperature unevenness of the fixing belt 20 in the longitudinal direction and the temperature unevenness of the heater 22 in the longitudinal direction.

Figure 25:
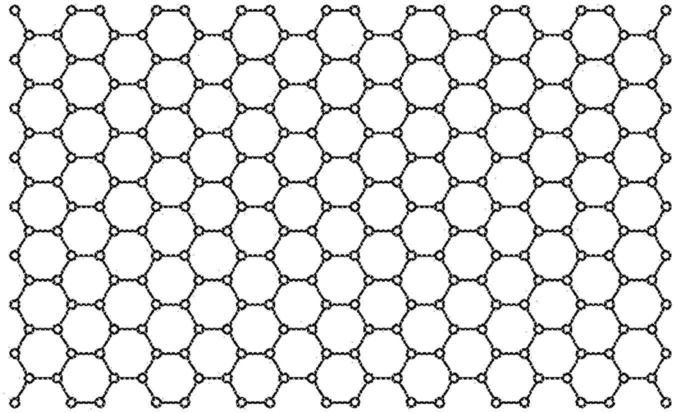
FIG. 25 is a schematic diagram illustrating a two dimensional atomic crystal structure of graphene.

Graphene is a flaky powder. Graphene has a planar hexagonal lattice structure of carbon atoms, as illustrated in FIG. 25. The graphene sheet is usually a single layer. The single layer of carbon may contain impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described later are measured by, for example, a transmission electron microscope (TEM).

Figure 26:
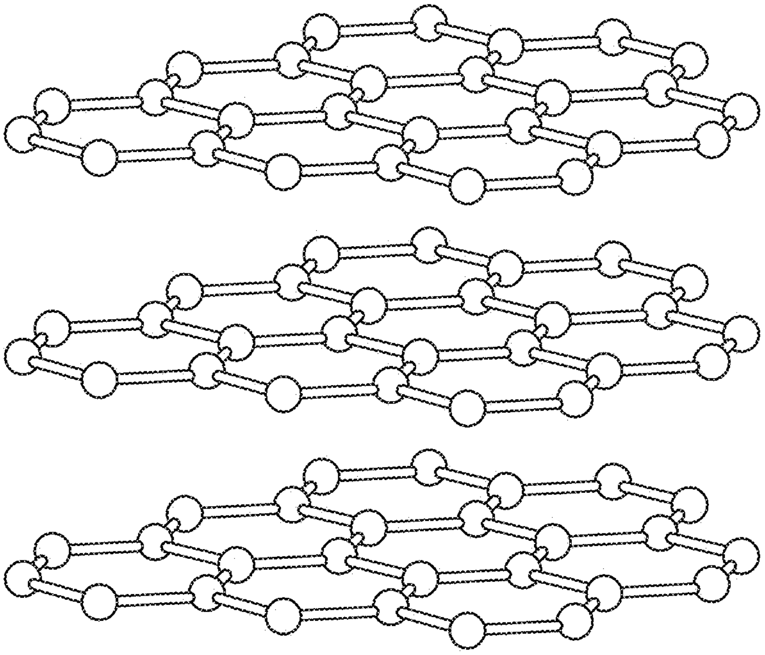
FIG. 26 is a schematic diagram illustrating a three-dimensional atomic crystal structure of graphite.

Graphite obtained by multilayering graphene has a large thermal conduction anisotropy. As illustrated in FIG. 26, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 28 and the second high thermal conduction member 36 that are made of graphite each have the heat transfer efficiency in the longitudinal direction larger than the heat transfer efficiency in the thickness direction of the first high thermal conduction member 28 and the second high thermal conduction member 36 (that is, the stacking direction of these members), reducing the heat transferred to the heater holder 23. Accordingly, the above-described structure can efficiently decrease the temperature unevenness of the heater 22 in the longitudinal direction and can minimize the heat transferred to the heater holder 23. Since the first high thermal conduction member 28 and the second high thermal conduction member 36 that are made of graphite are not oxidized at about 700 degrees or lower, the first high thermal conduction member 28 and the second high thermal conduction member 36 each have an excellent heat resistance.

The physical properties and dimensions of the graphite sheet may be appropriately changed according to the function required for the first high thermal conduction member 28 or the second high thermal conduction member 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first high thermal conduction member 28 or a width of the second high thermal conduction member 36 may be increased in response to a large width of the fixing nip N or a large width of the heater 22.

From the viewpoint of increasing mechanical strength, the number of layers of the graphite sheet is preferably 11 or more. The graphite sheet may partially include a single layer portion and a multilayer portion.

As long as the second high thermal conduction member 36 faces a part of each of neighboring resistive heat generators 31 and at least a part of the gap area between the neighboring resistive heat generators 31, the configuration of the second high thermal conduction member 36 is not limited to the configuration illustrated in FIG. 23. For example, as illustrated in FIG. 27, a second high thermal conduction member 36A is longer than the base 30 in the short-side direction, and both ends of the second high thermal conduction member 36A in the short-side direction are outside the base 30 in FIG. 27. A second high thermal conduction member 36B faces a range in which the resistive heat generator 31 is disposed in the short-side direction. A second high thermal conduction member 36C faces a part of the gap area and a part of each of neighboring resistive heat generators 31.

Figure 28:
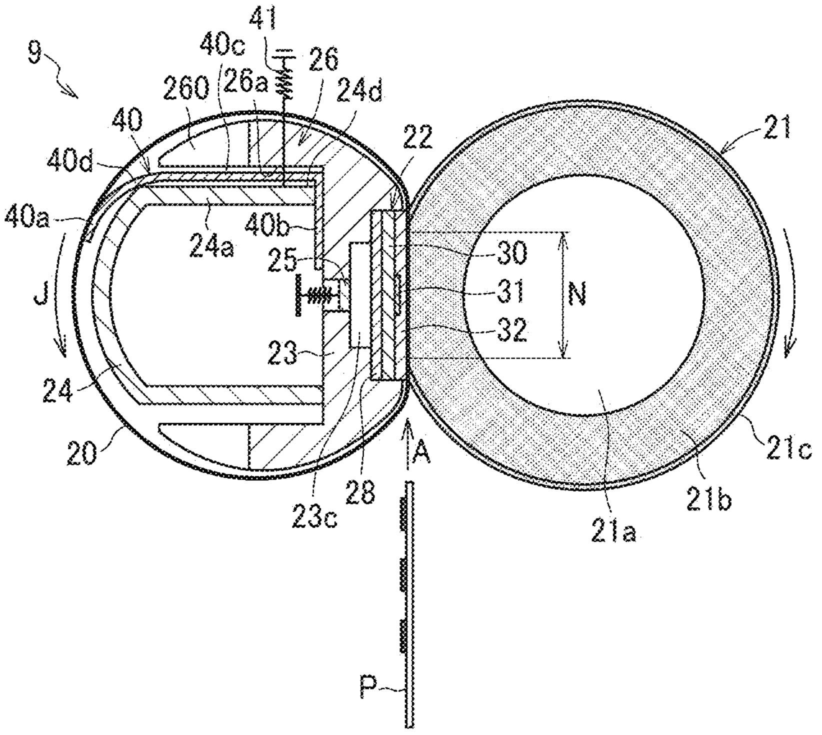
FIG. 28 is a schematic sectional side view of the fixing device different from the fixing devices of FIGS. 2 and 21.

As illustrated in FIG. 28, the fixing device according to the present embodiment has a gap between the first high thermal conduction member 28 and the heater holder 23 in the thickness direction that is the lateral direction in FIG. 28. In other words, the fixing device 9 has a gap 23*c* serving as a thermal insulation layer. The gap 23*c* is in a partial area of the recessed portion 23*b* (see FIG. 22). In the recessed portion 23*b* of the heater holder 23, the heater 22, the first high thermal conduction member 28, and the second high thermal conduction member 36 are set, but the second high thermal conduction member is not set in the partial area. The partial area is a part of or entire area of the recessed portion 23*b* other than an area on which the second high thermal conduction member 36 is set in the longitudinal direction and a part of the recessed portion 23*b* in the short-side direction. The gap 23*c* has a depth deeper than other portions to receive the first high thermal conduction member 28. The above-described structure minimizes the contact area between the heater holder 23 and the first high thermal conduction member 28. Minimizing the contact area prevents heat transfer from the first high thermal conduction member 28 to the heater holder 23 and enables the heater 22 to efficiently heat the fixing belt 20. In the cross section of the fixing device 9 in which the second high thermal conduction member 36 is set, the second high thermal conduction member 36 is in contact with the heater holder 23 as illustrated in FIG. 21 of the above-described embodiment.

In particular, the fixing device 9 according to the present embodiment has the gap 23*c* facing the entire area of the resistive heat generators 31 in the short-side direction that is the vertical direction in FIG. 28. The gap 23*c* prevents heat transfer from the first high thermal conduction member 28 to the heater holder 23, and the heater 22 can efficiently heat the fixing belt 20. The fixing device 9 may include a thermal insulation layer made of heat insulator having a lower thermal conductivity than the thermal conductivity of the heater holder 23 instead of a space like the gap 23*c* serving as the thermal insulation layer.

In the above description, the second high thermal conduction member 36 is a member different from the first high thermal conduction member 28, but the present embodiment is not limited to this. For example, the first high thermal conduction member 28 may have a thicker portion than the other portion so that the thicker portion faces the separation area B.

The fixing device in the above-described embodiment illustrated in FIG. 21 or FIG. 28 may also include the above-described conductor 40 and the resistor 41, which can prevent the insulation layer from being damaged by the voltage that is higher than expected and is applied to the alternating current power supply by the lightning or the like.

The above-described embodiments are illustrative and do not limit this disclosure. It is therefore to be understood that within the scope of the appended claims, numerous additional modifications and variations are possible to this disclosure otherwise than as specifically described herein.

Figure 29:
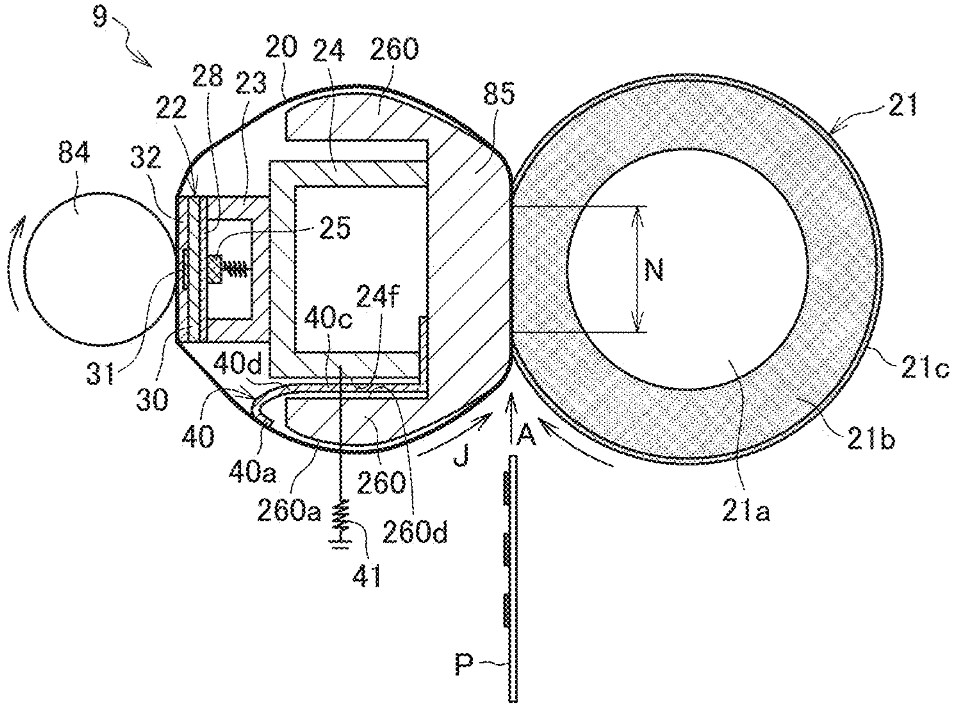
FIG. 29 is a schematic sectional side view of the fixing device different from the fixing devices of FIGS. 2, 21, and 28.
Figure 30:
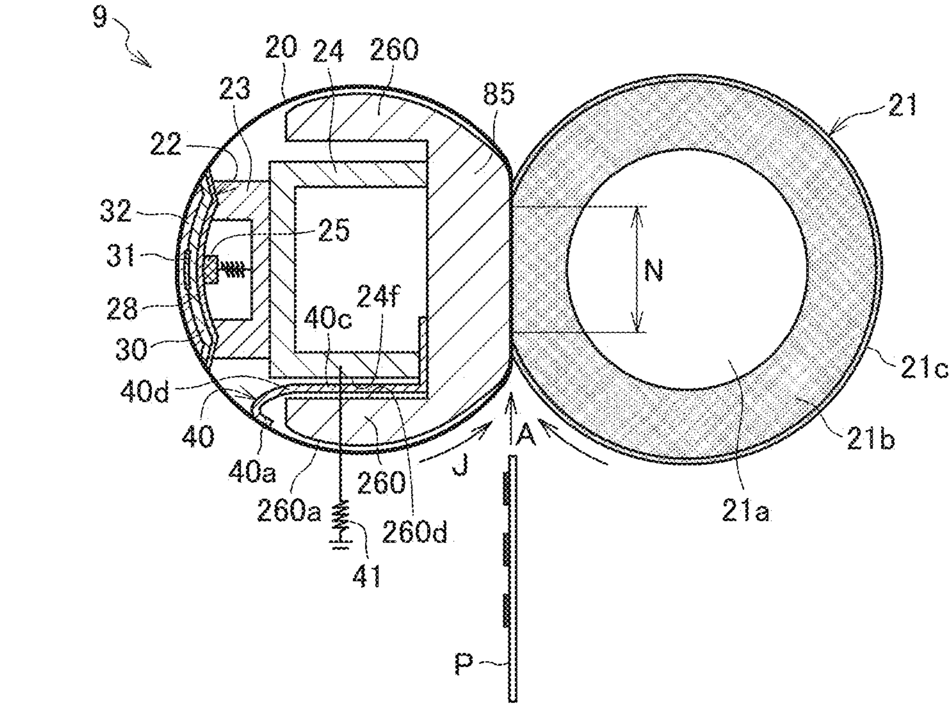
FIG. 30 is a schematic sectional side view of the fixing device different from the fixing devices of FIGS. 2, 21, 28, and 29.
Figure 31:
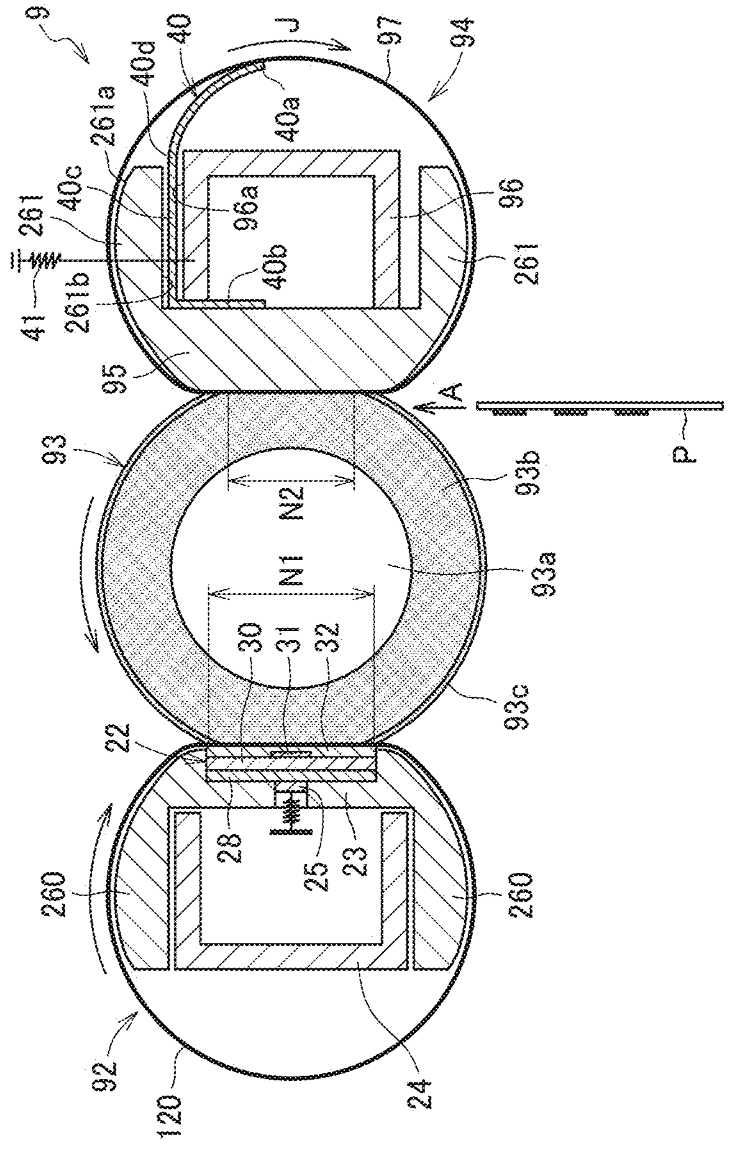
FIG. 31 is a schematic sectional side view of the fixing device different from the fixing devices of FIGS. 2, 21, and 28 to 30.

The embodiments of the present disclosure are also applicable to fixing devices as illustrated in FIGS. 29 to 31, respectively, other than the fixing device 9 described above. The following briefly describes a construction of each of the fixing devices depicted in FIGS. 29 to 31, respectively.

First, the fixing device 9 illustrated in FIG. 29 includes a pressurization roller 84 opposite the pressure roller 21 with respect to the fixing belt 20. The pressurization roller 84 is an opposed rotator that rotates and is opposite the fixing belt 20 as the rotator. The fixing belt 20 is sandwiched by the pressurization roller 84 and the heater 22 and heated by the heater 22. On the other hand, a nip formation pad 85 serving as a nip former is disposed inside the loop formed by the fixing belt 20 and disposed opposite the pressure roller 21. The nip formation pad 85 is supported by the stay 24. The nip formation pad 85 sandwiches the fixing belt 20 together with the pressure roller 21, thereby forming the fixing nip N.

The guide ribs 260 are disposed upstream and downstream from the nip formation pad 85. The conductor 40 is disposed between the stay 24 and the guide rib 260 upstream from the nip formation pad 85. The one end 40*a* of the conductor 40 is in contact with the inner surface of the fixing belt 20 as the rotator.

A description is provided of the construction of the fixing device 9 as illustrated in FIG. 30. The fixing device 9 does not include the pressurization roller 84 described above with reference to FIG. 30. In order to attain a contact length for which the heater 22 contacts the fixing belt 20 in the circumferential direction thereof, the heater 22 is curved into an arc in cross section that corresponds to a curvature of the fixing belt 20. Other parts of the fixing device 9 illustrated in FIG. 30 are the same as the fixing device 9 illustrated in FIG. 29.

Finally, the fixing device 9 illustrated in FIG. 31 is described. The fixing device 9 includes a heating assembly 92, a fixing roller 93 as a fixing rotator, and a pressing assembly 94 as a pressure rotator. The heating assembly 92 includes the heater 22, the first high thermal conduction member 28, the heater holder 23, the stay 24, which are described in the above embodiments, and a heating belt 120. The fixing roller 93 is an opposed rotator that rotates and faces the heating belt 120 as the rotator. The fixing roller 93 includes a core 93*a*, an elastic layer 93*b*, and a release layer 93*c*. The core 93*a* is a solid core made of iron. The elastic layer 93*b* coats the circumferential surface of the core 93*a*. The release layer 93*c* coats an outer circumferential surface of the elastic layer 93*b*. The pressure assembly 94 is opposite to the heating assembly 92 with respect to the fixing roller 93. The pressure assembly 94 includes a nip formation pad 95 and a stay 96 inside the loop of a pressure belt 97, and the pressure belt 97 is rotatably arranged to wrap around the nip formation pad 95 and the stay 96. The sheet P passes through the fixing nip N2 between the pressure belt 97 and the fixing roller 93 to be heated and pressed to fix the image onto the sheet P. An arrow J in FIG. 31 indicates a rotation direction of the pressure belt 97.

The guide ribs 261 are disposed upstream and downstream from the nip formation pad 95. A plurality of guide ribs 261 each having a substantially fan shape are disposed in the longitudinal direction. The guide rib 261 has a belt facing surface 261*a* facing the inner circumferential surface of the pressure belt 97. The belt facing surface 261*a* has an arc-shaped or convex curved surface extending in a belt circumferential direction.

The conductor 40 is disposed between the stay 96 and the guide rib 261 downstream from the nip formation pad 95. The one end 40*a* of the conductor 40 is in contact with the inner surface of the pressure belt 97 as the rotator.

In the fixing device 9 including the fixing roller 93 having a surface layer made of conductive material and the heating belt 120 made of conductive material, the conductor 40 may be disposed so as to face the first facing surface of the stay 24 and the second facing surface of the guide rib 260 upstream from the nip formation pad 95, similarly to the embodiment of FIG. 7. In this case, the one end of the conductor 40 is in contact with the inner surface of the heating belt 120 as the rotator.

The fixing device in the above-described embodiment illustrated in FIG. 29 to FIG. 31 may also include the above-described conductor 40 and the resistor 41, which can prevent the insulation layer from being damaged by the voltage that is higher than expected and is applied to the alternating current power supply by the lightning or the like.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

Figure 32:
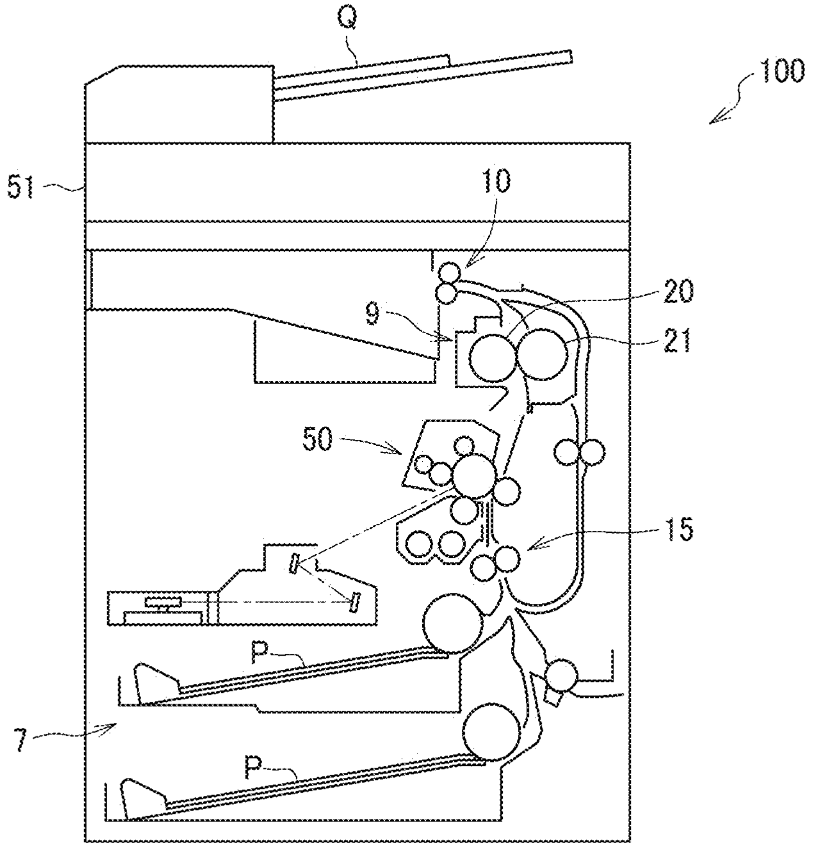
FIG. 32 is a schematic sectional view of an image forming apparatus different from the image forming apparatus of FIG. 1.

For example, as illustrated in FIG. 32, the image forming apparatus 100 according to the present embodiment includes an image forming device 50 including a photoconductor drum and the like, the sheet conveyer including the timing roller pair 15 and the like, the sheet feeder 7, the fixing device 9, the sheet ejection device 10, and a reading device 51. The sheet feeder 7 includes the plurality of sheet feeding trays, and the sheet feeding trays stores sheets of different sizes, respectively.

The reading device 51 reads an image of a document Q. The reading device 51 generates image data from the read image. The sheet feeder 7 stores the plurality of sheets P and feeds the sheet P to the conveyance path. The timing roller pair 15 conveys the sheet P on the conveyance path to the image forming device 50.

The image forming device 50 forms a toner image on the sheet P. Specifically, the image forming device 50 includes the photoconductor drum, a charging roller, the exposure device, the developing device, a supply device, a transfer roller, the cleaning device, and a discharging device. The toner image is, for example, an image of the document Q.

The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100.

Next, the fixing device 9 of the present embodiment is described. Description of configurations common to those of the fixing devices of the above-described embodiments is omitted as appropriate.

Figure 33:
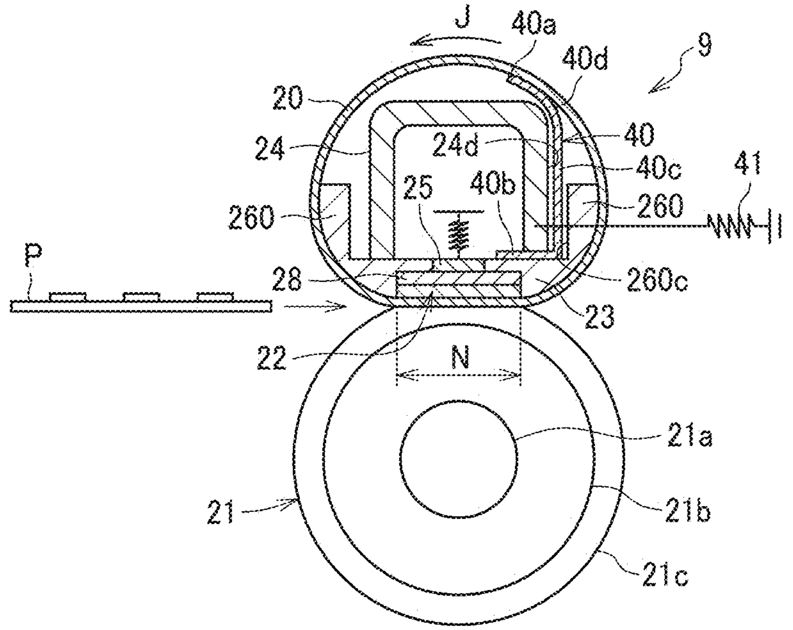
FIG. 33 is a schematic sectional side view of the fixing device according to an embodiment of the present disclosure.

As illustrated in FIG. 33, the fixing device 9 includes the fixing belt 20, the pressure roller 21, the heater 22, the heater holder 23, the stay 24, the thermistor 25, the first high thermal conduction member 28, and the conductor 40.

The fixing nip N is formed between the fixing belt 20 and the pressure roller 21. The nip width of the fixing nip N is 10 mm, and the linear velocity of the fixing device 9 is 240 mm/s.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the core 21*a*, the elastic layer 21*b*, and the release layer 21*c*. The pressure roller 21 has an outer diameter of 24 to 30 mm, and the elastic layer 21*b* has a thickness of 3 to 4 mm.

The heater 22 includes the base, the thermal insulation layer, the conductor layer including the resistive heat generator and the like, and the insulation layer, and is formed to have a thickness of 1 mm as a whole. The width Y of the heater 22 in the short-side direction is 13 mm.

The conductor 40 is disposed between the stay 24 and the guide rib 260 downstream from the fixing nip N. Specifically, the facing portion 40*c* of the conductor 40 faces the first facing surface 24*d* of the stay 24 and the second facing surface 260*c* of the guide rib 260 downstream from the fixing nip N. In the present embodiment, the stay 24 serves as the first facing member, and the guide rib 260 serves as the second facing member. The one end 40*a* of the conductor 40 is in contact with the inner surface of the fixing belt 20 as the rotator.

Figure 34:
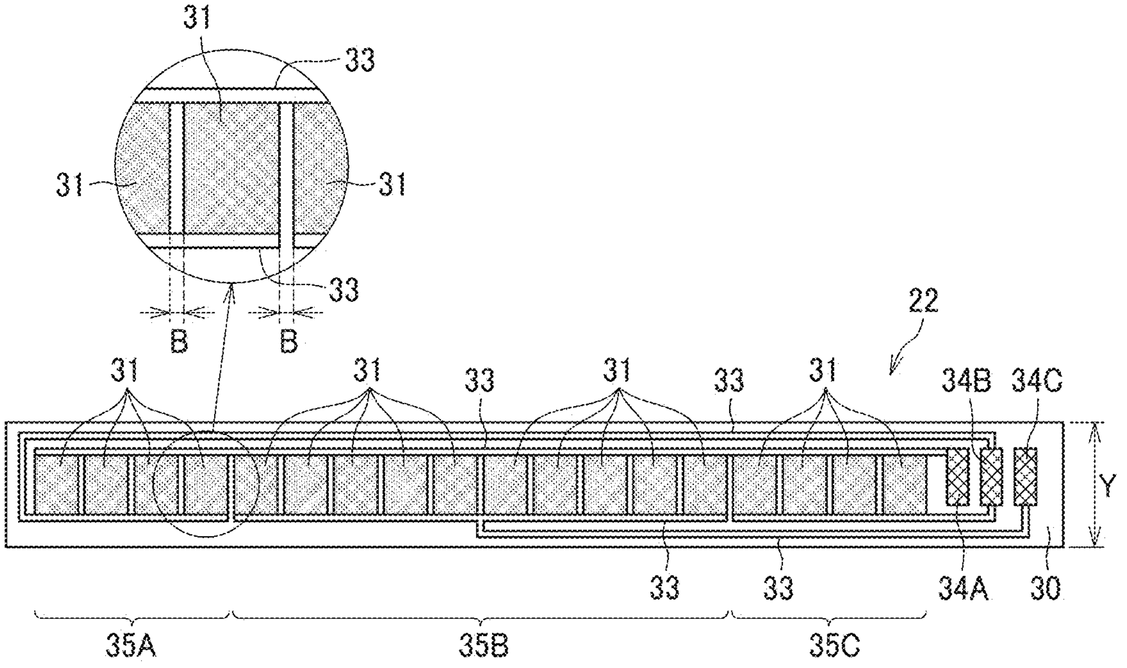
FIG. 34 is a plan view of the heater in the fixing device of FIG. 33.

As illustrated in FIG. 34, the conductor layer of the heater 22 includes a plurality of resistive heat generators 31, power supply lines 33, and electrodes 34A to 34C. As illustrated in the enlarged view of FIG. 34, the separation area B is formed between neighboring resistive heat generators of the plurality of resistive heat generators 31 arranged in the longitudinal direction. The enlarged view of FIG. 34 illustrates two separation areas B, but the separation area B is formed between neighboring resistive heat generators of all the plurality of resistive heat generators 31. The resistive heat generators 31 configure three heat generation portions 35A to 35C. When a current flows between the electrodes 34A and 34B, the heat generation portions 35A and 35C generate heat. When a current flows between the electrodes 34A and 34C, the heat generation portion 35B generates heat. When the fixing device 9 fixes the toner image onto the small sheet, the heat generation portion 35B generates heat. When the fixing device 9 fixes the toner image onto the large sheet, all the heat generation portions 35A to 35C generate heat.

Figure 35:
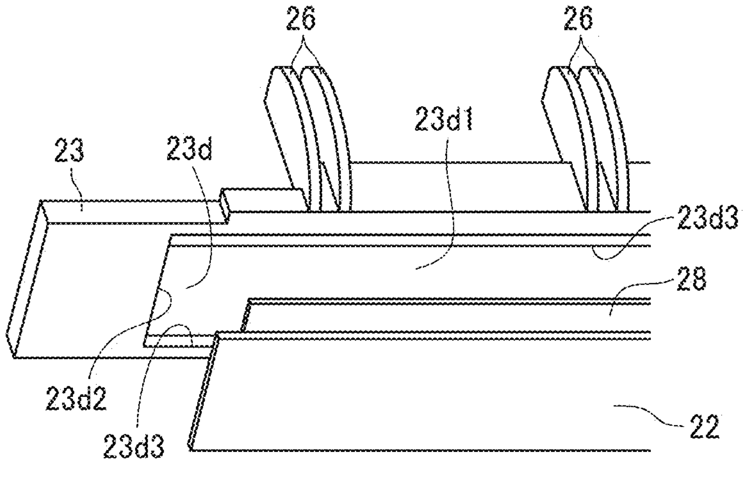
FIG. 35 is a partial perspective view of the heater and the heater holder in the fixing device of FIG. 33.

As illustrated in FIG. 35, the heater holder 23 holds the heater 22 and the first high thermal conduction member 28 in a recessed portion 23*d*. The recessed portion 23*d* is formed on the side of the heater holder 23 facing the heater 22. The recessed portion 23*d* has a bottom surface 23*d*1 and walls 23*d*2 and 23*d*3. The bottom surface 23*d*1 is substantially parallel to the base 30 and the surface recessed from the side of the heater holder 23 toward the stay 24. The walls 23*d*2 are both side surfaces of the recessed portion 23*d* in the longitudinal direction. The recessed portion 23*d* may have one wall 23*d*2. The walls 23*d*3 are both side surfaces of the recessed portion 23*d* in the short-side direction. The heater holder 23 has guide portions 26. The heater holder 23 is made of LCP.

Figure 36:
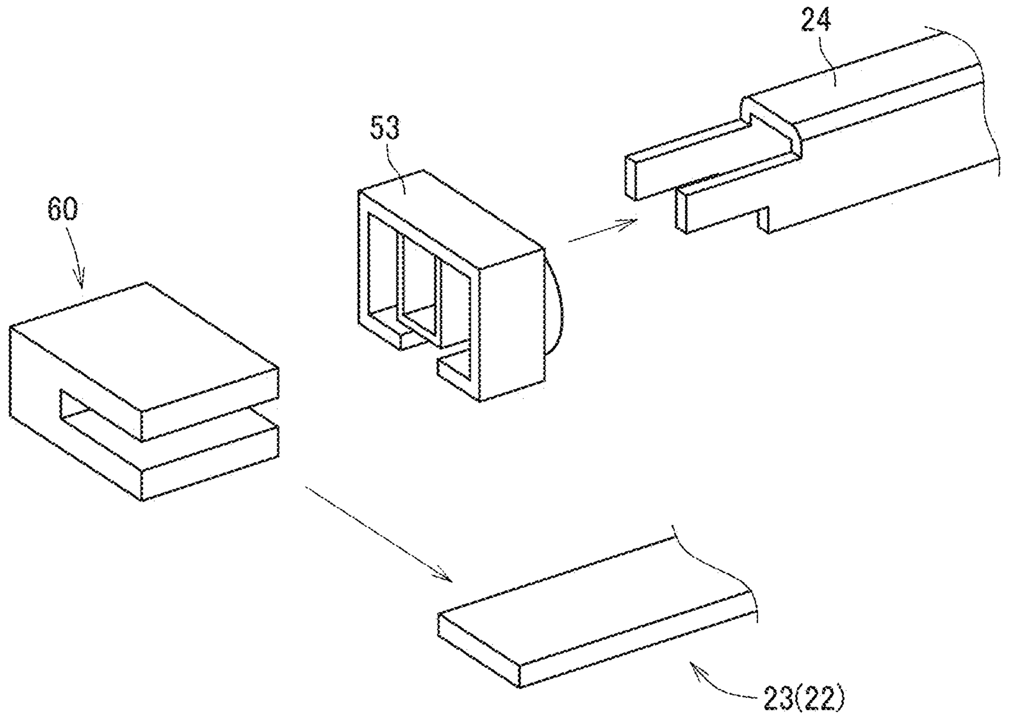
FIG. 36 is a perspective view of a connector attached to the heater.

As illustrated in FIG. 36, a connector 60 includes a housing made of resin such as LCP and a plurality of contact terminals fixed to the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively and the heat generation portions 35 are electrically coupled to the power supply provided in the image forming apparatus via the connector 60. The above-described configuration enables the power supply to supply power to the heat generation portions 35. Note that at least a part of each of the electrodes 34A to 34C is not coated by the insulation layer and therefore exposed to secure connection with the connector 60.

A flange 53 contacts the inner circumferential surface of the fixing belt 20 at each of both ends of the fixing belt 20 in the longitudinal direction to hold the fixing belt 20. The flange 53 is fixed to the housing of the fixing device 9. The flange 53 is inserted into each of both ends of the stay 24 (see an arrow direction from the flange 53 in FIG. 36).

To attach to the heater 22 and the heater holder 23, the connector 60 is moved in the short-side direction (see a direction indicated by an arrow from the connector 60 in FIG. 36). The connector 60 and the heater holder 23 may have a convex portion and a recessed portion to attach the connector 60 to the heater holder 23. The convex portion disposed on one of the connector 60 and the heater holder 23 is engaged with the recessed portion disposed on the other and relatively move in the recessed portion to attach the connector 60 to the heater holder 23. The connector 60 is attached to one end of the heater 22 and one end of the heater holder 23 in the longitudinal direction. The one end of the heater 22 and the one end of the heater holder 23 are farther from a portion in which the pressure roller 21 receives a driving force from a drive motor than the other end of the heater 22 and the other end of the heater holder 23, respectively.

Figure 37:
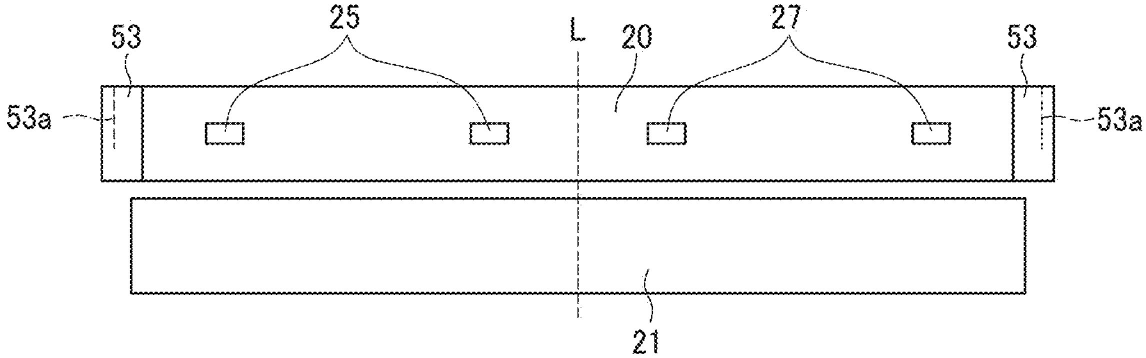
FIG. 37 is a schematic diagram illustrating an arrangement of thermistors and thermostats.

As illustrated in FIG. 37, one thermistor 25 faces a center portion of the inner circumferential surface of the fixing belt 20 in the longitudinal direction, and another thermistor 25 faces an end portion of the inner circumferential surface of the fixing belt 20 in the longitudinal direction. The heater 22 is controlled based on the temperature of the center portion of the fixing belt 20 and the temperature of the end portion of the fixing belt 20 in the longitudinal direction that are detected by the thermistors 25.

As illustrated in FIG. 37, one thermostat 27 faces a center portion of the inner circumferential surface of the fixing belt 20 in the longitudinal direction, and another thermostat 27 faces an end portion of the inner circumferential surface of the fixing belt 20 in the longitudinal direction. Each of the thermostats 27 shuts off a current to the heater 22 in response to a detection of a temperature of the fixing belt 20 higher than a predetermined threshold value.

Flanges 53 are disposed at both ends of the fixing belt 20 in the longitudinal direction and hold both ends of the fixing belt 20, respectively. The flange 53 is made of LCP.

Figure 38:
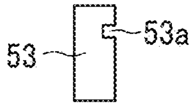
FIG. 38 is a schematic diagram illustrating a groove of a flange.

As illustrated in FIG. 38, the flange 53 has a slide groove 53*a*. The slide groove 53*a* extends in a direction in which the fixing belt 20 moves toward and away from the pressure roller 21. An engaging portion of the housing of the fixing device 9 is engaged with the slide groove 53*a*. The relative movement of the engaging portion in the slide groove 53*a* enables the fixing belt 20 to move toward and away from the pressure roller 21.

The fixing device 9 described above may also include the above-described conductor 40 and the resistor 41, which can prevent the insulation layer from being damaged by the voltage that is higher than expected and is applied to the alternating current power supply by the lightning or the like.

The recording medium P may be a sheet of plain paper, thick paper, thin paper, coated paper, art paper, tracing paper, overhead projector (OHP) transparency, plastic film, prepreg, or copper foil, or a postcard, an envelope, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application No. 2022-030766, filed on Mar. 1, 2022, in the Japan Patent Office, the entire disclosure of which is hereby incorporated by reference herein.

REFERENCE SIGNS LIST

1 Image forming apparatus
9 Fixing device (Heating device)
20 Fixing belt (Fixing rotator)
20*a* Base layer (Conductive layer)
21 Pressure roller (Pressure rotator)
22 Heater (Heating body)
32 Insulation layer
40 Conductor
41 Resistor

The invention claimed is:

1. A fixing device comprising:
a rotator including a conductive layer;
a pressure rotator configured to press the rotator to form a fixing nip between the rotator and the pressure rotator;
a heater in contact with an inner surface of the rotator, the heater configured to heat the rotator;
a conductor in contact with the conductive layer of the rotator, the conductor having a resistance value larger than 100 kΩ; and
a resistor having one end electrically coupled in series to the conductor and another end configured to be grounded via an image forming apparatus, wherein a resistance value of the resistor is larger than 100 kΩ.

2. The fixing device according to claim 1, wherein a sum of the resistance values of the conductor and the resistor is 4 MΩ or less.

3. The fixing device according to claim 1, wherein the resistance value of the conductor is 2 MΩ or more.

4. The fixing device according to claim 1, wherein the conductive layer is a base layer of the rotator, the conductive layer being the inner surface of the rotator.

5. An image forming apparatus comprising:
at least one image forming device configured to form an image on a recording medium; and
the fixing device according to claim 1.

6. The fixing device according to claim 1, wherein
the conductor has a shape of a sheet.

7. The fixing device according to claim 1, further comprising:
a stay; and
a guide portion, wherein
the conductor is between the stay and the guide portion, and the conductor is affixed to the stay.

8. The fixing device according to claim 1, further comprising:
a stay; and
a heater holder configured to hold the heater, wherein
the conductor is between the stay and the heater holder, and
the pressure rotator is further configured to apply a pressure which causes the stay and the conductor to come into contact.

9. A fixing device comprising:
a rotator including a conductive layer;
a pressure rotator configured to press the rotator to form a fixing nip between the rotator and the pressure rotator;
a heater in contact with an inner surface of the rotator, the heater configured to heat the rotator;
a conductor in contact with the conductive layer of the rotator, the conductor having a resistance value larger than 100 kΩ; and
a resistor having one end electrically coupled in series to the conductor and another end configured to be grounded via an image forming apparatus, wherein the resistance value of the conductor is larger than a resistance value of the conductive layer.

10. An image forming apparatus comprising:
at least one image forming device configured to form an image on a recording medium; and
the fixing device according to claim 9.

11. The fixing device according to claim 9, wherein a sum of the resistance values of the conductor and the resistor is 4 MΩ or less.

12. The fixing device according to claim 9, wherein the resistance value of the conductor is 2 MΩ or more.

13. The fixing device according to claim 9, wherein the conductive layer is a base layer of the rotator, the conductive layer being the inner surface of the rotator.

14. The fixing device according to claim 9, further comprising:

a stay; and a guide portion, wherein the conductor is between the stay and the guide portion, and the conductor is affixed to the stay.

15. The fixing device according to claim 9, further comprising:

a stay; and a heater holder configured to hold the heater, wherein the conductor is between the stay and the heater holder, and the pressure rotator is further configured to apply a pressure which causes the stay and the conductor to come into contact.

16. A fixing device comprising:

a rotator including a conductive layer;

a pressure rotator configured to press the rotator to form a fixing nip between the rotator and the pressure rotator;

a heater in contact with an inner surface of the rotator, the heater configured to heat the rotator;

a conductor in contact with the conductive layer of the rotator, the conductor having a resistance value larger than 100 kΩ; and a resistor having one end electrically coupled in series to the conductor and another end configured to be grounded via an image forming apparatus, wherein the resistance value of the conductor is within a range of ±10% of a resistance value of the resistor.

17. An image forming apparatus comprising:

at least one image forming device configured to form an image on a recording medium; and the fixing device according to claim 16.

18. The fixing device according to claim 16, wherein a sum of the resistance values of the conductor and the resistor is 4 MΩ or less.

19. The fixing device according to claim 16, wherein the resistance value of the conductor is 2 MΩ or more.

20. The fixing device according to claim 16, wherein the conductive layer is a base layer of the rotator, the conductive layer being the inner surface of the rotator.

* * * * *